(12) United States Patent
Chelnokov et al.

(10) Patent No.: US 11,213,368 B2
(45) Date of Patent: Jan. 4, 2022

(54) RECONSTRUCTION OF NON-VISIBLE PART OF TOOTH

(71) Applicant: Align Technology, Inc., San Jose, CA (US)

(72) Inventors: Fedor Chelnokov, Khimi Town (RU); Roman A. Roschin, Moscow (RU); Petr Ushanov, Khmiki (RU)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 14/166,530

(22) Filed: Jan. 28, 2014

(65) Prior Publication Data

US 2014/0142902 A1 May 22, 2014

Related U.S. Application Data

(63) Continuation of application No. 13/362,997, filed on Jan. 31, 2012, now Pat. No. 8,639,477, which is a (Continued)

(51) Int. Cl.
*A61C 7/00* (2006.01)
*A61C 13/00* (2006.01)
*G06F 30/00* (2020.01)

(52) U.S. Cl.
CPC .......... *A61C 7/002* (2013.01); *A61C 13/0004* (2013.01); *A61C 7/00* (2013.01); *G06F 30/00* (2020.01)

(58) Field of Classification Search
CPC ............................ A61C 7/002; A61C 13/0004
See application file for complete search history.

(56) References Cited

U.S. PATENT DOCUMENTS 2,171,695 A  9/1939  Harper
2,194,790 A  3/1940  Gluck
(Continued)

FOREIGN PATENT DOCUMENTS

AU     517102 B   11/1977
AU    3031677 A   11/1977
(Continued)

OTHER PUBLICATIONS

V. Blanz, A. Mehl, T. Vetter and H. -. Seidel, "A statistical method for robust 3D surface reconstruction from sparse data," Proceedings. 2nd International Symposium on 3D Data Processing, Visualization and Transmission, 2004. 3DPVT 2004., 2004, pp. 293-300, doi: 10.1109/TDPVT.2004.1335212. (Year: 2004).*
(Continued)

*Primary Examiner* — Akash Saxena
(74) *Attorney, Agent, or Firm* — Shay Glenn LLP

(57) ABSTRACT

A computer-implemented method for modeling a complete tooth of a patient to facilitate dental and/or orthodontic treatment. The method includes generating a first set of digital data representing a clinical crown; generating a second set of digital data representing a plurality of digital tooth models of a particular tooth type each having a first parameterization; processing the second set of digital data to obtain a third set of digital data representing an average tooth model of the particular tooth type having a second parameterization which is less than the first parameterization; fitting the third set of digital data to the first set of digital data to create a set of digital data representing an interim tooth model; and morphing the set of digital data representing the interim tooth model to substantially mimic the anatomical shape of the clinical crown of the first set of digital data.

19 Claims, 12 Drawing Sheets

Related U.S. Application Data continuation of application No. 12/055,192, filed on Mar. 25, 2008, now Pat. No. 8,108,189.

(56) References Cited

U.S. PATENT DOCUMENTS

| | | |
|---|---|---|
| 2,467,432 A | 4/1949 | Kesling |
| 2,531,222 A | 11/1950 | Kesling |
| 2,835,628 A | 5/1958 | Saffir |
| 3,089,487 A | 5/1963 | Enicks et al. |
| 3,092,907 A | 6/1963 | Traiger |
| 3,178,820 A | 4/1965 | Kesling |
| 3,211,143 A | 10/1965 | Grossberg |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,503,127 A | 3/1970 | Kasdin et al. |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,696,442 A * | 10/1972 | Amundsen ............... A61F 9/06 2/8.1 |
| 3,724,075 A | 4/1973 | Kesling |
| 3,738,005 A | 6/1973 | Cohen et al. |
| 3,797,115 A | 3/1974 | Silverman et al. |
| 3,813,781 A | 6/1974 | Forgione |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | McNall |
| 3,983,628 A | 10/1976 | Acevedo |
| 4,014,096 A | 3/1977 | Dellinger |
| 4,039,653 A | 8/1977 | DeFoney et al. |
| 4,055,895 A | 11/1977 | Huge |
| 4,094,068 A | 6/1978 | Schinhammer |
| 4,117,596 A | 10/1978 | Wallshein |
| 4,129,946 A | 12/1978 | Kennedy |
| 4,134,208 A | 1/1979 | Pearlman |
| 4,139,944 A | 2/1979 | Bergersen |
| 4,179,811 A | 12/1979 | Hinz |
| 4,179,812 A | 12/1979 | White |
| 4,183,141 A | 1/1980 | Dellinger |
| 4,195,046 A | 3/1980 | Kesling |
| 4,204,325 A | 5/1980 | Kaelble |
| 4,253,828 A | 3/1981 | Coles et al. |
| 4,255,138 A | 3/1981 | Frohn |
| 4,278,087 A | 7/1981 | Theeuwes |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,368,040 A | 1/1983 | Weissman |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | von Weissenfluh |
| 4,450,150 A | 5/1984 | Sidman |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,741,700 A | 5/1988 | Barabe |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,818,542 A | 4/1989 | De Luca et al. |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,861,268 A | 8/1989 | Garay et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,932,866 A | 6/1990 | Guis |
| 4,935,635 A | 6/1990 | O'Harra |
| 4,936,862 A | 6/1990 | Walker et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,968,251 A | 11/1990 | Darnell |
| 4,971,557 A | 11/1990 | Martin |
| 4,975,052 A | 12/1990 | Spencer et al. |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,049,077 A | 9/1991 | Goldin et al. |
| 5,055,039 A | 10/1991 | Abbatte et al. |
| 5,061,839 A | 10/1991 | Matsuno et al. |
| 5,083,919 A | 1/1992 | Quachi |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,257,203 A | 10/1993 | Riley et al. |
| 5,273,429 A | 12/1993 | Rekow et al. |
| 5,278,756 A | 1/1994 | Lemchen et al. |
| 5,306,144 A | 4/1994 | Hibst et al. |

(56) References Cited

U.S. PATENT DOCUMENTS

| | | |
|---|---|---|
| 5,314,335 A | 5/1994 | Fung |
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A | 7/1997 | Slootsky |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,911,576 A | 6/1999 | Ulrich et al. |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 10/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 5,993,413 A | 11/1999 | Aaltonen et al. |
| 6,002,706 A | 12/1999 | Staver et al. |
| 6,018,713 A | 1/2000 | Coli et al. |
| 6,044,309 A | 3/2000 | Honda |
| 6,049,743 A * | 4/2000 | Baba ................ A61C 13/0004 433/172 |
| 6,053,731 A | 4/2000 | Heckenberger |
| 6,068,482 A * | 5/2000 | Snow ...................... A61C 7/00 433/215 |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A | 9/2000 | Cleary |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 * | 4/2001 | Chishti .................... A61C 7/00 433/213 |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chisti et al. |
| 6,230,142 B1 | 5/2001 | Benigno et al. |
| 6,231,338 B1 | 5/2001 | de Josselin de Jong et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto |
| 6,299,438 B1 | 10/2001 | Sahagian et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,362,820 B1 * | 3/2002 | Hoppe ..................... G06T 17/20 345/419 |
| 6,364,660 B1 | 4/2002 | Durbin et al. |
| 6,382,975 B1 | 5/2002 | Poirier |
| 6,386,878 B1 * | 5/2002 | Pavlovskaia ............. A61C 9/00 433/215 |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |

(56) References Cited

U.S. PATENT DOCUMENTS

| | | |
|---|---|---|
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva et al. |
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 | 6/2003 | Phan et al. |
| 6,573,998 B2 | 6/2003 | Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers |
| 6,594,539 B1 | 7/2003 | Geng |
| 6,595,342 B1 | 7/2003 | Maritzen et al. |
| 6,597,934 B1 | 7/2003 | de Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,682,346 B2 | 1/2004 | Chishti et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,843,370 B2 | 1/2005 | Tuneberg |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan et al. |
| 7,156,655 B2 | 1/2007 | Sachdeva et al. |
| 7,156,661 B2 | 1/2007 | Choi et al. |
| 7,166,063 B2 | 1/2007 | Rahman et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,194,781 B1 | 3/2007 | Orjela |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Barach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |

(56) References Cited

U.S. PATENT DOCUMENTS

| | | |
|---|---|---|
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Müller |
| 7,695,327 B2 | 4/2010 | Bäuerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Körner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | de Josselin de Jong et al. |
| 7,824,180 B2 | 11/2010 | Abolfathi et al. |
| 7,841,464 B2 | 11/2010 | Cinader et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,837 B2 | 1/2011 | Chishti et al. |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,970,627 B2 | 6/2011 | Kuo et al. |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 * | 10/2011 | Imgrund .................. A61C 7/00 433/24 |
| 8,038,444 B2 | 10/2011 | Kitching et al. |
| 8,045,772 B2 | 10/2011 | Kosuge et al. |
| 8,075,306 B2 | 12/2011 | Kitching et al. |
| 8,077,949 B2 | 12/2011 | Liang et al. |
| 8,092,215 B2 | 1/2012 | Stone-Collonge et al. |
| 8,095,383 B2 | 1/2012 | Arnone et al. |
| 8,099,268 B2 | 1/2012 | Kitching et al. |
| 8,099,305 B2 | 1/2012 | Kuo et al. |
| 8,108,189 B2 | 1/2012 | Chelnokov et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,152,518 B2 | 4/2012 | Kuo |
| 8,160,334 B2 | 4/2012 | Thiel et al. |
| 8,172,569 B2 | 5/2012 | Matty et al. |
| 8,197,252 B1 | 6/2012 | Harrison |
| 8,201,560 B2 | 6/2012 | Dembro |
| 8,240,018 B2 | 8/2012 | Walter et al. |
| 8,275,180 B2 | 9/2012 | Kuo |
| 8,294,657 B2 | 10/2012 | Kim et al. |
| 8,296,952 B2 | 10/2012 | Greenberg |
| 8,306,608 B2 | 11/2012 | Mandelis et al. |
| 8,314,764 B2 | 11/2012 | Kim et al. |
| 8,332,015 B2 | 12/2012 | Ertl |
| 8,401,826 B2 | 3/2013 | Cheng et al. |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,523,565 B2 | 9/2013 | Matty et al. |
| 8,545,221 B2 | 10/2013 | Stone-Collonge et al. |
| 8,556,625 B2 | 10/2013 | Lovely |
| 8,650,586 B2 | 2/2014 | Lee et al. |
| 8,738,394 B2 | 5/2014 | Kuo |
| 8,771,149 B2 | 7/2014 | Rahman et al. |
| 8,843,381 B2 | 9/2014 | Kuo et al. |
| 8,870,566 B2 | 10/2014 | Bergersen |
| 8,874,452 B2 | 10/2014 | Kuo |
| 8,899,976 B2 | 12/2014 | Chen et al. |
| 8,944,812 B2 | 2/2015 | Kuo |
| 8,992,216 B2 | 3/2015 | Karazivan |
| 9,004,915 B2 | 4/2015 | Moss et al. |
| 9,039,418 B1 | 5/2015 | Rubbert |
| 9,084,535 B2 | 7/2015 | Girkin et al. |
| 9,084,657 B2 | 7/2015 | Matty et al. |
| 9,211,166 B2 | 12/2015 | Kuo et al. |
| 9,214,014 B2 | 12/2015 | Levin |
| 9,220,580 B2 | 12/2015 | Borovinskih et al. |
| 9,241,774 B2 | 1/2016 | Li et al. |
| 9,277,972 B2 | 3/2016 | Brandt et al. |
| 9,403,238 B2 | 8/2016 | Culp |
| 9,414,897 B2 | 8/2016 | Wu et al. |
| 9,463,287 B1 | 10/2016 | Lorberbaum et al. |
| 9,492,243 B2 | 11/2016 | Kuo |
| 9,566,132 B2 | 2/2017 | Stone-Collonge et al. |
| 9,589,329 B2 | 3/2017 | Levin |
| 9,675,427 B2 | 6/2017 | Kopelman |
| 9,730,769 B2 | 8/2017 | Chen et al. |
| 9,820,829 B2 | 11/2017 | Kuo |
| 9,830,688 B2 | 11/2017 | Levin |
| 9,844,421 B2 | 12/2017 | Moss et al. |
| 9,848,985 B2 | 12/2017 | Yang et al. |
| 10,123,706 B2 | 11/2018 | Elbaz et al. |
| 10,123,853 B2 | 11/2018 | Moss et al. |
| 10,154,889 B2 | 12/2018 | Chen et al. |
| 10,172,693 B2 | 1/2019 | Brandt et al. |
| 10,195,690 B2 | 2/2019 | Culp |
| 10,231,801 B2 | 3/2019 | Korytov et al. |
| 10,238,472 B2 | 3/2019 | Levin |
| 10,248,883 B2 | 4/2019 | Borovinskih et al. |
| 10,258,432 B2 | 4/2019 | Webber |
| 10,456,225 B2 * | 10/2019 | Jesenko ............... A61C 13/0004 |
| 2001/0002310 A1 * | 5/2001 | Chishti .................... A61C 7/00 433/24 |
| 2001/0032100 A1 | 10/2001 | Mahmud et al. |
| 2001/0038705 A1 * | 11/2001 | Rubbert .................... A61C 7/00 382/128 |
| 2001/0041320 A1 | 11/2001 | Phan et al. |
| 2002/0004727 A1 | 1/2002 | Knaus et al. |

(56) References Cited

U.S. PATENT DOCUMENTS

| | | |
|---|---|---|
| 2002/0006217 A1* | 1/2002 | Rubbert .............. A61C 7/146 |
| | | 382/131 |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0037489 A1* | 3/2002 | Jones .............. A61C 7/00 |
| | | 433/24 |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0177108 A1 | 11/2002 | Pavlovskaia et al. |
| 2002/0180739 A1* | 12/2002 | Reynolds .............. G06T 13/20 |
| | | 345/474 |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0008259 A1 | 1/2003 | Kuo et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0027098 A1 | 2/2003 | Manemann et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0169913 A1* | 9/2003 | Kopelman .............. A61B 6/14 |
| | | 382/132 |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0211440 A1 | 11/2003 | Kuo et al. |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1 | 1/2004 | Mah et al. |
| 2004/0013994 A1 | 1/2004 | Goldberg et al. |
| 2004/0019262 A1 | 1/2004 | Perelgut |
| 2004/0023188 A1 | 2/2004 | Pavlovskaia et al. |
| 2004/0029078 A1 | 2/2004 | Marshall |
| 2004/0038168 A1* | 2/2004 | Choi .............. A61C 7/00 |
| | | 433/24 |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0170941 A1 | 9/2004 | Phan et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0019732 A1* | 1/2005 | Kaufmann .............. A61C 7/00 |
| | | 433/213 |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Plan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0208449 A1 | 9/2005 | Abolfathi et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0036156 A1* | 2/2006 | Lachaine .............. A61N 5/1049 |
| | | 600/411 |
| 2006/0056670 A1 | 3/2006 | Hamadeh |
| 2006/0057533 A1 | 3/2006 | McGann |
| 2006/0063135 A1* | 3/2006 | Mehl .............. A61C 13/0004 |
| | | 433/223 |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0098007 A1 | 5/2006 | Rouet et al. |
| 2006/0099545 A1 | 5/2006 | Lia et al. |
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115782 A1 | 6/2006 | Li et al. |
| 2006/0115785 A1 | 6/2006 | Li et al. |
| 2006/0137813 A1 | 6/2006 | Robrecht et al. |
| 2006/0147872 A1* | 7/2006 | Andreiko .............. A61C 7/00 |
| | | 433/24 |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0046865 A1 | 3/2007 | Umeda et al. |
| 2007/0053048 A1 | 3/2007 | Kumar et al. |
| 2007/0054231 A1 | 3/2007 | Manemann et al. |
| 2007/0054237 A1 | 3/2007 | Neuschafer |
| 2007/0065768 A1 | 3/2007 | Nadav |

(56) References Cited

U.S. PATENT DOCUMENTS

| | | |
|---|---|---|
| 2007/0087300 A1 | 4/2007 | Willison et al. |
| 2007/0087302 A1 | 4/2007 | Raising et al. |
| 2007/0106138 A1 | 5/2007 | Beiski et al. |
| 2007/0122592 A1 | 5/2007 | Anderson et al. |
| 2007/0128574 A1 | 6/2007 | Kuo et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1* | 7/2007 | Matov .................. A61C 7/00 702/155 |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0207434 A1 | 9/2007 | Kuo et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0239488 A1 | 10/2007 | DeRosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1* | 3/2008 | Cheng .................. A61C 7/00 433/24 |
| 2008/0057467 A1 | 3/2008 | Gittelson |
| 2008/0057479 A1 | 3/2008 | Grenness |
| 2008/0059238 A1 | 3/2008 | Park et al. |
| 2008/0062429 A1 | 3/2008 | Liang et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0220395 A1* | 9/2008 | Marshall ............ A61C 13/0004 433/215 |
| 2008/0233530 A1 | 9/2008 | Cinader |
| 2008/0242144 A1 | 10/2008 | Dietz |
| 2008/0248443 A1 | 10/2008 | Chishti et al. |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kassayan et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0210032 A1 | 8/2009 | Beiski et al. |
| 2009/0218514 A1 | 9/2009 | Klunder et al. |
| 2009/0246726 A1* | 10/2009 | Chelnokov ............ A61C 7/002 433/24 |
| 2009/0286195 A1 | 11/2009 | Sears et al. |
| 2009/0298017 A1 | 12/2009 | Boerjes et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0062394 A1 | 3/2010 | Jones et al. |
| 2010/0068676 A1 | 3/2010 | Mason et al. |
| 2010/0145664 A1 | 6/2010 | Hultgren et al. |
| 2010/0145898 A1 | 6/2010 | Malfliet et al. |
| 2010/0165275 A1 | 7/2010 | Tsukamoto et al. |
| 2010/0167243 A1* | 7/2010 | Spiridonov ............ A61C 7/00 433/224 |
| 2010/0179789 A1 | 7/2010 | Sachdeva et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0268363 A1 | 10/2010 | Karim et al. |
| 2010/0268515 A1 | 10/2010 | Vogt et al. |
| 2010/0279243 A1 | 11/2010 | Cinader et al. |
| 2010/0280798 A1 | 11/2010 | Pattijn |
| 2010/0281370 A1 | 11/2010 | Rohaly et al. |
| 2011/0077913 A1 | 3/2011 | Rosen |
| 2011/0102549 A1 | 5/2011 | Takahashi |
| 2011/0104630 A1 | 5/2011 | Matov et al. |
| 2011/0164810 A1 | 7/2011 | Zang et al. |
| 2012/0029883 A1 | 2/2012 | Heinz et al. |
| 2012/0040311 A1 | 2/2012 | Nilsson |
| 2012/0166213 A1 | 6/2012 | Arnone et al. |
| 2012/0203513 A1 | 8/2012 | Chelnokov et al. |
| 2013/0103176 A1 | 4/2013 | Kopelman et al. |
| 2014/0081091 A1 | 3/2014 | Abolfathi et al. |
| 2014/0136222 A1 | 5/2014 | Arnone et al. |
| 2014/0280376 A1 | 9/2014 | Kuo |
| 2015/0004553 A1 | 1/2015 | Li et al. |
| 2015/0132708 A1 | 5/2015 | Kuo |
| 2015/0173856 A1 | 6/2015 | Iowe et al. |
| 2015/0320320 A1 | 11/2015 | Kopelman et al. |
| 2015/0320532 A1 | 11/2015 | Matty et al. |
| 2016/0003610 A1 | 1/2016 | Lampert et al. |
| 2016/0051345 A1 | 2/2016 | Levin |
| 2016/0064898 A1 | 3/2016 | Atiya et al. |
| 2016/0081768 A1 | 3/2016 | Kopelman et al. |
| 2016/0081769 A1 | 3/2016 | Kimura et al. |
| 2016/0095668 A1 | 4/2016 | Kuo et al. |
| 2016/0106520 A1 | 4/2016 | Borovinskih et al. |
| 2016/0120621 A1 | 5/2016 | Li et al. |
| 2016/0135924 A1 | 5/2016 | Choi et al. |
| 2016/0135925 A1 | 5/2016 | Mason et al. |
| 2016/0163115 A1 | 6/2016 | Furst |
| 2016/0217708 A1 | 7/2016 | Levin et al. |
| 2016/0220173 A1* | 8/2016 | Ribnick ................ A61B 5/4557 |
| 2016/0224976 A1* | 8/2016 | Lee .................... A61C 13/0004 |
| 2016/0302885 A1 | 10/2016 | Matov et al. |
| 2016/0338799 A1 | 11/2016 | Wu et al. |
| 2016/0367339 A1 | 12/2016 | Khardekar et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0020633 A1 | 1/2017 | Stone-Collonge et al. |
| 2017/0071705 A1 | 3/2017 | Kuo |
| 2017/0071706 A1* | 3/2017 | Lee .................... A61C 13/0004 |
| 2017/0100212 A1 | 4/2017 | Sherwood et al. |
| 2017/0100213 A1 | 4/2017 | Kuo |
| 2017/0105815 A1 | 4/2017 | Matov et al. |
| 2017/0135792 A1 | 5/2017 | Webber |
| 2017/0135793 A1 | 5/2017 | Webber et al. |
| 2017/0156821 A1 | 6/2017 | Kopelman et al. |
| 2017/0165032 A1 | 6/2017 | Webber et al. |
| 2017/0169562 A1* | 6/2017 | Somasundaram ...... G06T 7/0012 |
| 2017/0178327 A1* | 6/2017 | Somasundaram ...... G06F 17/50 |
| 2017/0258555 A1 | 9/2017 | Kopelman |
| 2017/0319296 A1 | 11/2017 | Webber et al. |
| 2018/0000563 A1 | 1/2018 | Shanjani et al. |
| 2018/0000565 A1 | 1/2018 | Shanjani et al. |
| 2018/0028064 A1 | 2/2018 | Elbaz et al. |
| 2018/0028065 A1 | 2/2018 | Elbaz et al. |
| 2018/0055602 A1 | 3/2018 | Kopelman et al. |
| 2018/0071055 A1 | 3/2018 | Kuo |

(56) References Cited

U.S. PATENT DOCUMENTS

| | | | |
|---|---|---|---|
| 2018/0096465 A1 | 4/2018 | Levin | |
| 2018/0125610 A1 | 5/2018 | Carrier et al. | |
| 2018/0153648 A1 | 6/2018 | Shanjani et al. | |
| 2018/0153649 A1 | 6/2018 | Wu et al. | |
| 2018/0153733 A1 | 6/2018 | Kuo | |
| 2018/0168788 A1 | 6/2018 | Fernie | |
| 2018/0192877 A1 | 7/2018 | Atiya et al. | |
| 2018/0228359 A1 | 8/2018 | Meyer et al. | |
| 2018/0280118 A1 | 10/2018 | Cramer | |
| 2018/0284727 A1 | 10/2018 | Cramer et al. | |
| 2018/0318043 A1 | 11/2018 | Li et al. | |
| 2018/0353264 A1 | 12/2018 | Riley et al. | |
| 2018/0360567 A1 | 12/2018 | Xue et al. | |
| 2018/0368944 A1 | 12/2018 | Sato et al. | |
| 2018/0368961 A1 | 12/2018 | Shanjani et al. | |
| 2019/0019187 A1 | 1/2019 | Miller et al. | |
| 2019/0021817 A1 | 1/2019 | Sato et al. | |
| 2019/0029522 A1 | 1/2019 | Sato et al. | |
| 2019/0029784 A1 | 1/2019 | Moalem et al. | |
| 2019/0046296 A1 | 2/2019 | Kopelman et al. | |
| 2019/0046297 A1 | 2/2019 | Kopelman et al. | |
| 2019/0069975 A1 | 3/2019 | Cam et al. | |
| 2019/0076026 A1 | 3/2019 | Elbaz et al. | |
| 2019/0076214 A1 | 3/2019 | Nyukhtikov et al. | |
| 2019/0076216 A1 | 3/2019 | Moss et al. | |
| 2019/0090983 A1 | 3/2019 | Webber et al. | |
| 2019/0183614 A1 | 6/2019 | Levin | |
| 2020/0349705 A1* | 11/2020 | Minchenkov | A61C 13/0004 |

FOREIGN PATENT DOCUMENTS

| | | | |
|---|---|---|---|
| CA | 1121955 A1 | 4/1982 | |
| CN | 1655732 A | 8/2005 | |
| CN | 1655733 A | 8/2005 | |
| CN | 1867317 A | 11/2006 | |
| CN | 102017658 A | 4/2011 | |
| DE | 2749802 A1 | 5/1978 | |
| DE | 3526198 A1 | 2/1986 | |
| DE | 4207169 A1 | 9/1993 | |
| DE | 69327661 T2 | 7/2000 | |
| DE | 102005043627 A1 | 3/2007 | |
| EP | 0428152 A1 | 5/1991 | |
| EP | 490848 A2 | 6/1992 | |
| EP | 541500 A1 | 5/1993 | |
| EP | 714632 B1 | 5/1997 | |
| EP | 774933 B1 | 12/2000 | |
| EP | 731673 B1 | 5/2001 | |
| EP | 1941843 A2 | 7/2008 | |
| EP | 1989764 B1 | 7/2012 | |
| ES | 463897 A1 | 1/1980 | |
| FR | 2369828 A1 | 6/1978 | |
| FR | 2867377 A1 | 9/2005 | |
| GB | 1550777 A | 8/1979 | |
| JP | 53-058191 A | 5/1978 | |
| JP | 4028359 A | 1/1992 | |
| JP | 9019443 | 7/1995 | |
| JP | 08-508174 A | 9/1996 | |
| JP | 2003245289 A | 9/2003 | |
| JP | 2000339468 A | 9/2004 | |
| JP | 2005527320 A | 9/2005 | |
| JP | 2005527321 A | 9/2005 | |
| JP | 2006043121 A | 2/2006 | |
| JP | 2007151614 A | 6/2007 | |
| JP | 2007260158 A | 10/2007 | |
| JP | 2007537824 A | 12/2007 | |
| JP | 2008067732 A | 3/2008 | |
| JP | 2008523370 A | 7/2008 | |
| JP | 2009000412 A | 1/2009 | |
| JP | 2009018173 A | 1/2009 | |
| JP | 2009078133 A | 4/2009 | |
| JP | 2009101386 A | 5/2009 | |
| JP | 2009205330 A | 9/2009 | |
| KR | 10-20020062793 A | 7/2002 | |
| KR | 10-20070108019 A | 11/2007 | |
| KR | 10-20090065778 A | 6/2009 | |
| TW | 480166 B | 3/2002 | |
| WO | WO91/004713 A1 | 4/1991 | |
| WO | WO92/03102 A1 | 3/1992 | |
| WO | WO94/010935 A1 | 5/1994 | |
| WO | WO96/23452 A1 | 8/1996 | |
| WO | WO98/032394 A1 | 7/1998 | |
| WO | WO98/044865 A1 | 10/1998 | |
| WO | WO01/08592 A1 | 2/2001 | |
| WO | WO01/85047 A2 | 11/2001 | |
| WO | WO02/017776 A2 | 3/2002 | |
| WO | WO02/024100 A1 | 3/2002 | |
| WO | WO02/058583 A1 | 8/2002 | |
| WO | WO02/062252 A1 | 8/2002 | |
| WO | WO02/095475 A1 | 11/2002 | |
| WO | WO03/003932 A2 | 1/2003 | |
| WO | WO2005/114183 A1 | 12/2005 | |
| WO | WO2006/096558 A2 | 9/2006 | |
| WO | WO2006/100700 A1 | 9/2006 | |
| WO | WO2006/133548 A1 | 12/2006 | |
| WO | WO2007/019709 A2 | 2/2007 | |
| WO | WO2007/071341 A2 | 6/2007 | |
| WO | WO2007/103377 A2 | 9/2007 | |
| WO | WO2008/115654 A1 | 9/2008 | |
| WO | WO2009/016645 A2 | 2/2009 | |
| WO | WO2009/085752 A2 | 7/2009 | |
| WO | WO2009/089129 A1 | 7/2009 | |

OTHER PUBLICATIONS

Vevin W. Y. Mok, et al. Pose Estimation of Teeth Through Crown-Shape Matching. Medical Imaging 2002: Image Processing, Milan Sonka, J. Michael Fitzpatrick, Editos, Proceedings of SPIE vol. 4684 (2002) SPIE; pp. 955-964.

Benson; Highly porous polymers; American Laboratory; pp. 1-12; Apr. 2003.

Besl et al.; A method of registration of 3-D shapes; IEEE Transactions on Pattern Analysis; 14(2); pp. 239-256; Feb. 1992.

Brannon-Peppas; Biomaterials: polymers in controlled drug delivery; Medical Devicelink, Medical Plastics and Biomaterials Magazine; 18 pages; retrieved from the internet (http://www.devicelink.com/grabber.php3? URL=http://www.devicelink.com/mpb/archive/9 . . . ); Nov. 1997.

Cangialosi et al.; The ABO discrepancy index: A measure of case complexity; American Journal of Orthodontics and Dentofacial Orthopedics; 125(3); pp. 270-278; Mar. 2004.

Dental Monitoring; Basics: Howto put the cheek retractor?; 1 page (Screenshot); retrieved from the interenet (https://www.youtube.com/watch?v=6K1HXw4Kq3c); May 27, 2016.

Dental Monitoring; Dental monitoring tutorial; 1 page (Screenshot); retrieved from the internet (https:www.youtube.com/watch?v=Dbe3udOf9_c); Mar. 18, 2015.

Dentalwings; Intraoral scanner; 7 pages; retrieved from the internet (https://web.archive.org/web/20160422114335/http://www.dentalwings.com/products/intraoral-scanner/); available as of Apr. 4, 2016.

Dentalwings; I series dental impression scanner; 8 pages; retrieved from the internet (https://web.archive.org/web/20160502145908/http://www.dentalwings.com/products/scan-and-design-systems/iseries/); available as of May 2, 2016.

Ecligner Selfie; Change your smile; 1 page (screenshot); retrieved from the internet (https:play.google.com/store/apps/details?id=parklict.ecligner); on Feb. 13, 2018.

Landgraf et al.; Polymer microcarrier exhibiting zero-oder release; Drug Delivery Technology; 3(1); pp. 1-14; (year of pub. sufficiently earlier than effective US filing date and any foreign priority date) 2003.

Lawrence; Salivary markers of systemic disease: noninvasive diagnosis of disease and monitoring of general health; Journal of the Canadian Dental Association Clinical Practice; 68(3); pp. 170-174; Mar. 2002.

Middleton et al.; Materials synthetic biodegradable polymers as medical devices; Medical Plastics and Biomaterials Magazine; MPB Article Index; 14 pages; Mar. 1998.

(56) References Cited

OTHER PUBLICATIONS

Nishanian et al.; Oral fluids as an alternative to serum for measurement of markers of immune activation; Clinical and Diagnostic Laboratory Immunology; 5(4); pp. 507-512; Jul. 1998.
Ortho-Tain; What is ortho-tain; 2 pages; retrieved from the internet (http://www.orthotain.com/what-is-ortho-tain®), on Jul. 2, 2014.
Prime; An introduction to thermosets; 8 pages; retrieved from the internet (http://www.primethermosets.com); on Aug. 13, 2009.
Sigma-Aldrich Co.; Tutorial, biocompatible/biodegradable materials; 3 pages; retrieved from the internet (http://www.sigmaldrich.com/area_of_interest/organic_chemistry/materials_science/biocompatible_biodegradable/tutorial/biocompatible_polymers.html); (year of pub. sufficiently earlier than effective US filing date and any foreign priority date) 2004.
Svec et al.; Molded rigid monolithic porous polymers: an inexpensive, efficient, and versatile alternative to beads for design of materials for numerous applications; Industrial and Engineering Chemistry Research; 38(1); pp. 34-48; Jan. 4, 1999.
3 Shape Trios 3; Insane speed-scanning with 3shape trios 3 intracral canner; (Screenshot); 2 pages; retrieved from the internet at You Tube (https//www.youtube.com/watch?v=X5CviUZ5DpQ&feature=youtu.be; available as of Sep. 18, 2015.
U.S. Food and Drug Administration; Color additives; 3 pages; retrieved from the internet (https://websrchive.org/web/20070502213911/http://www.cfsan.fda.gov/~dms/col-toc.html); last known as May 2, 2007.
Unknown, Excerpt from a reference on water-soluble polymers, 2 pages; date unknown, (Available as of Dec. 9, 2004).
Van Der Eijk et al.; Paired measurements of quantitative hepatitis B virus DNA in saliva and serum of chronic hepatitis B patients: implications for saliva as infectious agent; Journal of Clinical Virology; 29(2); pp. 92-94; Feb. 2004.
Chen et al.; U.S. Appl. No. 16/223,019 entitled "Release agent receptacle," filed Dec. 17, 2018.
Elbaz et al.; U.S. Appl. No. 16/370,646 entitled "Methods and apparatuses for forming a three-dimensional volumetric model of a subject's teeth," filed Mar. 29, 2019.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Berland; The use of smile libraries for cosmetic dentistry; Dental Tribunne: Asia pacfic Edition; pp. 16-18; Mar. 29, 2006.
Bookstein; Principal warps: Thin-plate splines and decomposition of deformations; IEEE Transactions on pattern analysis and machine intelligence; 11(6); pp. 567-585; Jun. 1989.
Cadent Inc.; OrthoCAD ABO user guide; 38 pages; Dec. 21, 2005.
Cadent Inc.; Reviewing and modifying an orthoCAD case; 4 pages; Feb. 14, 2005.
Daniels et al.; The development of the index of complexity outcome and need (ICON); British Journal of Orthodontics; 27(2); pp. 149-162; Jun. 2000.
Dentrix; Dentrix G3, new ffeatures; 2 pages; retrieved from the internet (http://www.dentrix.com/g3/new_features/index.asp); on Jun. 6, 2008.
Di Giacomo et al.; Clinical application of sterolithographic surgical guides for implant placement: Preliminary results; Journal Periodontolgy; 76(4); pp. 503-507; Apr. 2005.
Gansky; Dental data mining: potential pitfalls and practical issues; Advances in Dental Research; 17(1); pp. 109-114; Dec. 2003.
Geomagic; Dental reconstruction; 1 page; retrieved from the internet (http://geomagic.com/en/solutions/industry/detal_desc.php) on Jun. 6, 2008.
Gottschalk et al.; OBBTree: A hierarchical structure for rapid interference detection; 12 pages; (http://www.cs.unc.edu/?geom/OBB/OBBT.html); retieved from te internet (https://www.cse.iitk.ac.in/users/amit/courses/RMP/presentations/dslamba/presentation/sig96.pdf) on Apr. 25, 2019.
gpsdentaire.com; Get a realistic smile simulation in 4 steps with GPS; a smile management software; 10 pages; retrieved from the internet (http://www.gpsdentaire.com/en/preview/) on Jun. 6, 2008.
Karaman et al.; A practical method of fabricating a lingual retainer; Am. Journal of Orthodontic and Dentofacial Orthopedics; 124(3); pp. 327-330; Sep. 2003.
Mantzikos et al.; Case report: Forced eruption and implant site development; The Angle Orthodontist; 68(2); pp. 179-186; Apr. 1998.
Methot; Get the picture with a gps for smile design in 3 steps; Spectrum; 5(4); pp. 100-105; (year of pub. sufficiently earlier than effective US filing date and any foreign priority date) 2006.
ormco.com; Increasing clinical performance with 3D interactive treatment planning and patient-specific appliances; 8 pages; retrieved from the internet (http://www.konsident.com/wp-content/files_mf/1295385693http_ormco.com_index_cmsfilesystemaction_fileOrmcoPDF_whitepapers.pdf) on Feb. 27, 2019.
OrthoCAD downloads; retrieved Jun. 27, 2012 from the internet (www.orthocad.com/download/downloads.asp); 2 pages; Feb. 14, 2005.
Page et al.; Validity and accuracy of a risk calculator in predicting periodontal disease; Journal of the American Dental Association; 133(5); pp. 569-576; May 2002.
Patterson Dental; Cosmetic imaging; 2 pages retrieved from the internet (http://patterson.eaglesoft.net/cnt_di_cosimg.html) on Jun. 6, 2008.
Rose et al.; The role of orthodontics in implant dentistry; British Dental Journal; 201(12); pp. 753-764; Dec. 23, 2006.
Rubin et al.; Stress analysis of the human tooth using a three-dimensional finite element model; Journal of Dental Research; 62(2); pp. 82-86; Feb. 1983.
Sarment et al.; Accuracy of implant placement with a sterolithographic surgical guide; journal of Oral and Maxillofacial Implants; 118(4); pp. 571-577; Jul. 2003.
Smalley; Implants for tooth movement: Determining implant location and orientation: Journal of Esthetic and Restorative Dentistry; 7(2); pp. 62-72; Mar. 1995.
Smart Technology; Smile library II; 1 page; retrieved from the internet (http://smart-technology.net/) on Jun. 6, 2008.
Smile-Vision_The smile-vision cosmetic imaging system; 2 pages; retrieved from the internet (http://www.smile-vision.net/cos_maging.php) on Jun. 6, 2008.
Szeliski; Introduction to computer vision: Structure from motion; 64 pages; retrieved from the internet (http://robots.stanford.edu/cs223b05/notes/CS%20223-B%20L10%structurefrommotion1b.ppt, on Feb. 3, 2005.
Video of Dicom to Surgical Guides; [Not Enclosed], Can be viewed at <URL:https://youtu.be/47KtOmCEFQk; Published Apr. 4, 2016.
Virtual Orthodontics; Our innovative software; 2 pages; (http://www.virtualorthodontics.com/innovativesoftware.html); retrieved from the internet (https://web.archive.org/web/20070518085145/http://www.virtualorthodontics.com/innovativesoftware.html); (year of pub. sufficiently earlier than effective US filing date and any foreign priority date) 2005.
Wong et al.; Computer-aided design/computer-aided manufacturing surgical guidance for placement of dental implants: Case report; Implant Dentistry; 16(2); pp. 123-130; Sep. 2007.
Wong et al.; The uses of orthodontic study models in diagnosis and treatment planning; Hong Knog Dental Journal; 3(2); pp. 107-115; Dec. 2006.
Yaltara Software; Visual planner; 1 page; retrieved from the internet (http://yaltara.com/vp/) on Jun. 6, 2008.
Zhang et al.; Visual speech features extraction for improved speech recognition; 2002 IEEE International conference on Acoustics, Speech and Signal Processing; vol. 2; 4 pages; May 13-17, 2002.
Li et al.; U.S. Appl. No. 16/171,159 entitled "Alternative bite adjustment structures," filed Oct. 25, 2018.
Culp; U.S. Appl. No. 16/236,220 entitled "Laser cutting," filed Dec. 28, 2018.
Culp; U.S. Appl. No. 16/265,287 entitled "Laser cutting," filed Feb. 1, 2019.

(56) References Cited

OTHER PUBLICATIONS

Arnone et al.; U.S. Appl. No. 16/235,449 entitled "Method and system for providing indexing and cataloguing of orthodontic related treatment profiles and options," filed Dec. 28, 2018.
Mason et al.; U.S. Appl. No. 16/374,648 entitled "Dental condition evaluation and treatment," filed Apr. 3, 2019.
Brandt et al.; U.S. Appl. No. 16/235,490 entitled "Dental wire attachment," filed Dec. 28, 2018.
Kou; U.S. Appl. No. 16/270,891 entitled "Personal data file," filed Feb. 8, 2019.
Bernabe et al.; Are the lower incisors the best predictors for the unerupted canine and premolars sums? An analysis of Peruvian sample; The Angle Orthodontist; 75(2); pp. 202-207; Mar. 2005.
Collins English Dictionary; Teeth (definition); 9 pages; retrieved from the internet (https:www.collinsdictionary.com/US/dictionary/english/teeth) on May 13, 2019.
dictionary.com; Plural (definition); 6 pages; retrieved from the internet ( https://www.dictionary.com/browse/plural#) on May 13, 2019.
dictionary.com; Quadrant (definition); 6 pages; retrieved from the internet ( https://www.dictionary.com/browse/quadrant?s=t) on May 13, 2019.
Martinelli et al.; Prediction of lower permanent canine and premolars width by correlation methods; The Angle Orthodontist; 75(5); pp. 805-808; Sep. 2005.
Nourallah et al.; New regression equations for prediciting the size of unerupted canines and premolars in a contemporary population; The Angle Orthodontist; 72(3); pp. 216-221; Jun. 2002.
Paredes et al.; A new, accurate and fast digital method to predict unerupted tooth size; The Angle Orthodontist; 76(1); pp. 14-19; Jan. 2006.
AADR. American Association for Dental Research; Summary of Activities; Los Angeles, CA; p. 195; Mar. 20-23,(year of pub. sufficiently earlier than effective US filing date and any foreign priority date) 1980.
Alcaniz et al; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.
Alexander et al.; The DigiGraph Work Station Part 2 Clinical Management; J. Clin. Orthod.; pp. 402-407; (Author Manuscript); Jul. 1990.
Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.
Allesee Orthodontic Appliance: Important Tip About Wearing the Red White & Blue Active Clear Retainer System; Allesee Orthodontic Appliances-Pro Lab; 1 page; (year of pub. sufficiently earlier than effective US filing date and any foreign priority date); 1998.
Allesee Orthodontic Appliances: DuraClearTM; Product information; 1 page; (year of pub. sufficiently earlier than effective US filing date and any foreign priority date) 1997.
Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.
Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.
Allesee Orthodontic Appliances; The Choice is Clear: Red, White & Blue . . . The Simple, Affordable, No-Braces Treatment;(Patient Information); retrieved from the internet (http://ormco.com/aoa/appliancesservices/RWB/patients.html); 2 pages on May 19, 2003.
Allesee Orthodontic Appliances; The Red, White & Blue Way to Improve Your Smile; (information for patients), 2 pages; (year of pub. sufficiently earlier than effective US filing date and any foreign priority date) 1992.
Allesee Orthodontic Appliances; You may be a candidate for this invisible no-braces treatment; product information for patients; 2 pages; (year of pub. sufficiently earlier than effective US filing date and any foreign priority date) 2002.
Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.
Altschuler et al.; Laser Electro-Optic System for Rapid Three-Dimensional (3D) Topographic Mapping of Surfaces; Optical Engineering; 20(6); pp. 953-961; Dec. 1981.
Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.
Altschuler; 3D Mapping of Maxillo-Facial Prosthesis; AADR Abstract #607; 2 pages total, (year of pub. sufficiently earlier than effective US filing date and any foreign priority date) 1980.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub. sufficiently earlier than effective US filing date and any foreign priority date) 1989.
Bartels et al.; An Introduction to Splines for Use in Computer Graphics and Geometric Modeling; Morgan Kaufmann Publishers; pp. 422-425 Jan. 1, 1987.
Baumrind et al., "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.
Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.
Baumrind; Integrated Three-Dimensional Craniofacial Mapping: Background, Principles, and Perspectives; Seminars in Orthodontics; 7(4); pp. 223-232; Dec. 2001.
Begole et al.; A Computer System for the Analysis of Dental Casts; The Angle Orthodontist; 51(3); pp. 252-258; Jul. 1981.
Bernard et al.; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988.
Bhatia et al.; A Computer-Aided Design for Orthognathic Surgery; British Journal of Oral and Maxillofacial Surgery; 22(4); pp. 237-253; Aug. 1, 1984.
Biggerstaff et al.; Computerized Analysis of Occlusion in the Postcanine Dentition; American Journal of Orthodontics; 61(3); pp. 245-254; Mar. 1972.
Biggerstaff; Computerized Diagnostic Setups and Simulations; Angle Orthodontist; 40(I); pp. 28-36; Jan. 1970.
Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.
Blu et al.; Linear interpolation revitalized; IEEE Transactions on Image Processing; 13(5); pp. 710-719; May 2004.
Bourke, Coordinate System Transformation; 1 page; retrived from the internet (http://astronomy.swin.edu.au/ pbourke/prolection/coords) on Nov. 5, 2004; Jun. 1996.

(56) References Cited

OTHER PUBLICATIONS

Boyd et al.; Three Dimensional Diagnosis and Orthodontic Treatment of Complex Malocclusions With the Invisalipn Appliance; Seminars in Orthodontics; 7(4); pp. 274-293; Dec. 2001.

Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.

Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.

Burstone et al.; Precision Adjustment of the Transpalatal Lingual Arch: Computer Arch Form Predetermination; American Journal of Orthodontics; 79(2);pp. 115-133; Feb. 1981.

Burstone; Dr. Charles J. Burstone on The Uses of the Computer in Orthodontic Practice (Part 1); Journal of Clinical Orthodontics; 13(7); pp. 442-453; (interview); Jul. 1979.

Burstone; Dr. Charles J. Burstone on The Uses of the Computer in Orthodontic Practice (Part 2); journal of Clinical Orthodontics; 13(8); pp. 539-551 (interview); Aug. 1979.

Cardinal Industrial Finishes; Powder Coatings; 6 pages; retrieved from the internet (http://www.cardinalpaint.com) on Aug. 25, 2000.

Carnaghan, An Alternative to Holograms for the Portrayal of Human Teeth; 4th Int'l. Conf. on Holographic Systems, Components and Applications; pp. 228-231; Sep. 15, 1993.

Chaconas et al,; The DigiGraph Work Station, Part 1, Basic Concepts; Journal of Clinical Orthodontics; 24(6); pp. 360-367; (Author Manuscript); Jun. 1990.

Chafetz et al.; Subsidence of the Femoral Prosthesis, A Stereophotogrammetric Evaluation; Clinical Orthopaedics and Related Research; No. 201; pp. 60-67; Dec. 1985.

Chiappone; Constructing the Gnathologic Setup and Positioner; Journal of Clinical Orthodontics; 14(2); pp. 121-133; Feb. 1980.

Chishti et al.; U.S. Appl. No. 60/050,342 entitled "Procedure for moving teeth using a seires of retainers," filed Jun. 20, 1997.

CSI Computerized Scanning and Imaging Facility; What is a maximum/minimum intensity projection (MIP/MinIP); 1 page; retrieved from the internet (http://csi.whoi.edu/content/what-maximumminimum-intensity-projection-mipminip); Jan. 4, 2010.

Cottingham; Gnathologic Clear Plastic Positioner; American Journal of Orthodontics; 55(1); pp. 23-31; Jan. 1969.

Crawford; CAD/CAM in the Dental Office: Does It Work?; Canadian Dental Journal; 57(2); pp. 121-123 Feb. 1991.

Crawford; Computers in Dentistry: Part 1: CAD/CAM: The Computer Moves Chairside, Part 2: F. Duret A Man With A Vision, Part 3: The Computer Gives New Vision—Literally, Part 4: Bytes 'N Bites The Computer Moves From The Front Desk To The Operatory; Canadian Dental Journal; 54(9); pp. 661-666 Sep. 1988.

Crooks; CAD/CAM Comes to USC; USC Dentistry; pp. 14-17; (year of pub. sufficiently earlier than effective US filing date and any foreign priority date) Spring 1990.

Cureton; Correcting Malaligned Mandibular Incisors with Removable Retainers; Journal of Clinical Orthodontics; 30(7); pp. 390-395; Jul. 1996.

Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.

Cutting et al.; Three-Dimensional Computer-Assisted Design of Craniofacial Surgical Procedures: Optimization and Interaction with Cephalometric and CT-Based Models; Plastic and Reconstructive Surgery; 77(6); pp. 877-885; Jun. 1986.

DCS Dental AG; The CAD/CAM 'DCS Titan System' for Production of Crowns/Bridges; DSC Production; pp. 1-7; Jan. 1992.

Defranco et al.; Three-Dimensional Large Displacement Analysis of Orthodontic Appliances; Journal of Biomechanics; 9(12); pp. 793-801; Jan. 1976.

Dental Institute University of Zurich Switzerland; Program for International Symposium on Computer Restorations: State of the Art of the CEREC-Method; 2 pages; May 1991.

Dentrac Corporation; Dentrac document; pp. 4-13; (year of pub. sufficiently earlier than effective US filing date and any foreign priority date) 1992.

Dent-x; Dentsim . . . Dent-x's virtual reality 3-D training simulator . . . A revolution in dental education; 6 pages; retrieved from the internet (http://www.dent-x.com/DentSim.htm); on Sep. 24, 1998.

Di Muzio et al.; Minimum intensity projection (MinIP); 6 pages; retrieved from the internet (https://radiopaedia.org/articles/minimum-intensity-projection-minip) on Sep. 6, 2018.

Doruk et al.; The role of the headgear timer in extraoral co-operation; European Journal of Orthodontics; 26; pp. 289-291; Jun. 1, 2004.

Doyle; Digital Dentistry; Computer Graphics World; pp. 50-52 andp. 54; Oct. 2000.

Duret et al.; CAD/CAM Imaging in Dentistry; Current Opinion in Dentistry; 1(2); pp. 150-154; Apr. 1991.

Duret et al.; CAD-CAM in Dentistry; Journal of the American Dental Association; 117(6); pp. 715-720; Nov. 1988.

Duret; The Dental CAD/CAM, General Description of the Project; Hennson International Product Brochure, 18 pages; Jan. 1986.

Duret; Vers Une Prosthese Informatisee; Tonus; 75(15); pp. 55-57; (English translation attached); 23 pages; Nov. 15, 1985.

Economides; The Microcomputer in the Orthodontic Office; Journal of Clinical Orthodontics; 13(11); pp. 767-772; Nov. 1979.

Elsasser; Some Observations on the History and Uses of the Kesling Positioner; American Journal of Orthodontics; 36(5); pp. 368-374; May 1, 1950.

English translation of Japanese Laid-Open Publication No. 63-11148 to inventor T. Ozukuri (Laid-Open on Jan. 18, 1998) pp. 1-7.

Faber et al.; Computerized Interactive Orthodontic Treatment Planning; American Journal of Orthodontics; 73(1); pp. 36-46; Jan. 1978.

Felton et al.; A Computerized Analysis of the Shape and Stability of Mandibular Arch Form; American Journal of Orthodontics and Dentofacial Orthopedics; 92(6); pp. 478-483; Dec. 1987.

Friede et al.; Accuracy of Cephalometric Prediction in Orthognathic Surgery; Journal of Oral and Maxillofacial Surgery; 45(9); pp. 754-760; Sep. 1987.

Friedrich et al.; Measuring system for in vivo recording of force systems in orthodontic treatment-concept and analysis of accuracy; J. Biomech.; 32(1); pp. 81-85; (Abstract Only) Jan. 1999.

Futterling et al.; Automated Finite Element Modeling of a Human Mandible with Dental Implants; JS WSCG '98-Conference Program; 8 pages; retrieved from the Internet (https://dspace5.zcu.cz/bitstream/11025/15851/1/Strasser_98.pdf); on Aug. 21, 2018.

Gao et al.; 3-D element Generation for Multi-Connected Complex Dental and Mandibular Structure; IEEE Proceedings International Workshop in Medical Imaging and Augmented Reality; pp. 267-271; Jun. 12, 2001.

Gim-Alldent Deutschland, "Das DUX System: Die Technik," 3 pages; (English Translation Included); (year of pub. sufficiently earlier than effective US filing date and any foreign priority date); 2002.

Gottleib et al.; JCO Interviews Dr. James A. McNamura, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.

Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.

Grest, Daniel; Marker-Free Human Motion Capture in Dynamic Cluttered Environments from a Single View-Point, PhD Thesis; 171 pages; Dec. 2007.

Guess et al.; Computer Treatment Estimates in Orthodontics and Orthognathic Surgery; Journal of Clinical Orthodontics; 23(4); pp. 262-268; 11 pages; (Author Manuscript); Apr. 1989.

Heaven et al.; Computer-Based Image Analysis of Artificial Root Surface Caries; Abstracts of Papers #2094; Journal of Dental Research; 70:528; (Abstract Only); Apr. 17-21, 1991.

Highbeam Research; Simulating stress put on jaw. (ANSYS Inc.'s finite element analysis software); 2 pages; retrieved from the

(56) References Cited

OTHER PUBLICATIONS

Internet (http://static.highbeam.eom/t/toolingampproduction/november011996/simulatingstressputonfa . . . ); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.
Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96; (Abstract Only); (year of pub. sufficiently earlier than effective US filing date and any foreign priority date) 1999.
Invisalign; You were made to move. There's never been a better time to straighten your teeth with the most advanced clear aligner in the world; Product webpage; 2 pages; retrieved from the internet (www.invisalign.com/) on Dec. 28, 2017.
JCO Interviews; Craig Andreiko , DDS, MS on the Elan and Orthos Systems; Interview by Dr. Larry W. White; Journal of Clinical Orthodontics; 28(8); pp. 459-468; 14 pages; (Author Manuscript); Aug. 1994.
JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.
Jerrold; The Problem, Electronic Data Transmission and the Law; American Journal of Orthodontics and Dentofacial Orthopedics; 113(4); pp. 478-479; 5 pages; (Author Manuscript); Apr. 1998.
Jones et al.; An Assessment of the Fit of a Parabolic Curve to Pre- and Post-Treatment Dental Arches; British Journal of Orthodontics; 16(2); pp. 85-93; May 1989.
Kamada et.al.; Case Reports On Tooth Positioners Using LTV Vinyl Silicone Rubber; J. Nihon University School of Dentistry; 26(1); pp. 11-29; (year of pub. sufficiently earlier than effective US filing date and any foreign priority date) 1984.
Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.
Kanazawa et al.; Three-Dimensional Measurements of the Occlusal Surfaces of Upper Molars in a Dutch Population; Journal of Dental Research; 63(11); pp. 1298-1301; Nov. 1984.
Kesling et al.; The Philosophy of the Tooth Positioning Appliance; American Journal of Orthodontics and Oral surgery; 31(6); pp. 297-304; Jun. 1945.
Kesling; Coordinating the Predetermined Pattern and Tooth Positioner with Conventional Treatment; American Journal of Orthodontics and Oral Surgery; 32(5); pp. 285-293; May 1946.
Kleeman et al.; The Speed Positioner; J. Clin. Orthod.; 30(12); pp. 673-680; Dec. 1996.
Kochanek; Interpolating Splines with Local Tension, Continuity and Bias Control; Computer Graphics; 18(3); pp. 33-41; Jan. 1, 1984.
Kunii et al.; Articulation Simulation for an Intelligent Dental Care System; Displays; 15(3); pp. 181-188; Jul. 1994.
Kuroda et al.; Three-Dimensional Dental Cast Analyzing System Using Laser Scanning; American Journal of Orthodontics and Dentofacial Orthopedics; 110(4); pp. 365-369; Oct. 1996.
Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.
Leinfelder et al.; A New Method for Generating Ceramic Restorations: a CAD-CAM System; Journal of the American Dental Association; 118(6); pp. 703-707; Jun. 1989.

Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.
McCann; Inside the ADA; J. Amer. Dent. Assoc, 118:286-294; Mar. 1989.
McNamara et al.; Invisible Retainers; J. Clin Orthod.; pp. 570-578; 11 pages; (Author Manuscript); Aug. 1985.
McNamara et al.; Orthodontic and Orthopedic Treatment in the Mixed Dentition; Needham Press; pp. 347-353; Jan. 1993.
Moermann et al, Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.
Moles; Correcting Mild Malalignments—As Easy As One, Two, Three; AOA/Pro Corner; 11 (2); 2 pages; (year of pub. sufficiently earlier than effective US filing date and any foreign priority date) 2002.
Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.
Nahoum; The Vacuum Formed Dental Contour Appliance; N. Y. State Dent. J.; 30(9); pp. 385-390; Nov. 1964.
Nash; Cerec CAD/CAM Inlays: Aesthetics and Durability in a Single Appointment; Dentistry Today; 9(8); pp. 20, 22-23 and 54; Oct. 1990.
Newcombe; DTAM: Dense tracking and mapping in real-time; 8 pages; retrieved from the internet (http://www.doc.ic.ac.uk/?ajd/Publications/newcombe_etal_iccv2011.pdf; on Dec. 2011.
Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.
Ogawa et al.; Mapping, profiling and clustering of pressure pain threshold (PPT) in edentulous oral muscosa; Journal of Dentistry; 32(3); pp. 219-228; Mar. 2004.
Ogimoto et al.; Pressure-pain threshold determination in the oral mucosa; Journal of Oral Rehabilitation; 29(7); pp. 620-626; Jul. 2002.
Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.
Pinkham; Foolish Concept Propels Technology; Dentist, 3 pages , Jan./Feb. 1989.
Pinkham; Inventor's CAD/CAM May Transform Dentistry; Dentist; pp. 1 and 35, Sep. 1990.
Ponitz; Invisible retainers; Am. J. Orthod.; 59(3); pp. 266-272; Mar. 1971.
Procera Research Projects; Procera Research Projects 1993 " Abstract Collection; 23 pages; (year of pub. sufficiently earlier than effective US filing date and any foreign priority date) 1993.
Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.
Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.
Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.
Redmond et al.; Clinical Implications of Digital Orthodontics; American Journal of Orthodontics and Dentofacial Orthopedics; 117(2); pp. 240-242; Feb. 2000.

(56) References Cited

OTHER PUBLICATIONS

Rekow et al.; CAD/CAM for Dental Restorations—Some of the Curious Challenges; IEEE Transactions on Biomedical Engineering; 38(4); pp. 314-318; Apr. 1991.

Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.

Rekow; A Review of the Developments in Dental CAD/CAM Systems; Current Opinion in Dentistry; 2; pp. 25-33; Jun. 1992.

Rekow; CAD/CAM in Dentistry: A Historical Perspective and View of the Future; Journal Canadian Dental Association; 58(4); pp. 283, 287-288; Apr. 1992.

Rekow; Computer-Aided Design and Manufacturing in Dentistry: A Review of the State of the Art; Journal of Prosthetic Dentistry; 58(4); pp. 512-516; Dec. 1987.

Rekow; Dental CAD-CAM Systems: What is the State of the Art?; The Journal of the American Dental Association; 122(12); pp. 43-48; Dec. 1991.

Rekow; Feasibility of an Automated System for Production of Dental Restorations, Ph.D. Thesis; Univ. of Minnesota, 250 pages, Nov. 1988.

Richmond et al.; The Development of the PAR Index (Peer Assessment Rating): Reliability and Validity.; The European Journal of Orthodontics; 14(2); pp. 125-139; Apr. 1992.

Richmond et al.; The Development of a 3D Cast Analysis System; British Journal of Orthodontics; 13(1); pp. 53-54; Jan. 1986.

Richmond; Recording the Dental Cast in Three Dimensions; American Journal of Orthodontics and Dentofacial Orthopedics; 92(3); pp. 199-206; Sep. 1987.

Rudge; Dental Arch Analysis: Arch Form, A Review of the Literature; The European Journal of Orthodontics; 3(4); pp. 279-284; Jan. 1981.

Sahm et al.; "Micro-Electronic Monitoring of Functional Appliance Wear"; Eur J Orthod.; 12(3); pp. 297-301; Aug. 1990.

Sahm; Presentation of a wear timer for the clarification of scientific questions in orthodontic orthopedics; Fortschritte der Kieferorthopadie; 51 (4); pp. 243-247; (Translation Included) Jul. 1990.

Sakuda et al.; Integrated Information-Processing System in Clinical Orthodontics: An Approach with Use of a Computer Network System; American Journal of Orthodontics and Dentofacial Orthopedics; 101(3); pp. 210-220; 20 pages; (Author Manuscript) Mar. 1992.

Schellhas et al.; Three-Dimensional Computed Tomography in Maxillofacial Surgical Planning; Archives of Otolaryngology—Head and Neck Surgery; 114(4); pp. 438-442; Apr. 1988.

Schroeder et al.; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.

Shilliday; Minimizing finishing problems with the mini-positioner; American Journal of Orthodontics; 59(6); pp. 596-599; Jun. 1971.

Siemens; Cerec—Computer-Reconstruction, High Tech in der Zahnmedizin; 15 pagesl; (Includes Machine Translation); (year of pub. sufficiently earlier than effective US filing date and any foreign priority date); 2004.

Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.

Sirona Dental Systems GmbH, Cerec 3D, Manuel utiiisateur, Version 2.0X (in French); 114 pages; (English translation of table of contents included); (year of pub. sufficiently earlier than effective US filing date and any foreign priority date); 2003.

Stoll et al.; Computer-aided Technologies in Dentistry; Dtsch Zahna'rztl Z 45, pp. 314-322; (English Abstract Included); (year of pub. sufficiently earlier than effective US filing date and any foreign priority date) 1990.

Sturman; Interactive Keyframe Animation of 3-D Articulated Models; Proceedings Graphics Interface '84; vol. 86; pp. 35-40; May-Jun. 1984.

The American Heritage, Stedman's Medical Dictionary; Gingiva; 3 pages; retrieved from the interent (http://reference.com/search/search?q=gingiva) on Nov. 5, 2004.

Thera Mon; "Microsensor"; 2 pages; retrieved from the internet (www.english.thera-mon.com/the-product/transponder/index.html); on Sep. 19, 2016.

Thorlabs; Pellin broca prisms; 1 page; retrieved from the internet (www.thorlabs.com); Nov. 30, 2012.

Tiziani et al.; Confocal principle for macro and microscopic surface and defect analysis; Optical Engineering; 39(1); pp. 32-39; Jan. 1, 2000.

Truax; Truax Clasp-Less(TM) Appliance System; The Functional Orthodontist; 9(5); pp. 22-24, 26-8; Sep.-Oct. 1992.

Tru-Tatn Orthodontic & Dental Supplies, Product Brochure, Rochester, Minnesota 55902, 16 pages; (year of pub. sufficiently earlier than effective US filing date and any foreign priority date) 1996.

U.S. Department of Commerce, National Technical Information Service, Holodontography: An Introduction to Dental Laser Holography; School of Aerospace Medicine Brooks AFB Tex; Mar. 1973, 40 pages; Mar. 1973.

U.S. Department of Commerce, National Technical Information Service; Automated Crown Replication Using Solid Photography SM; Solid Photography Inc., Melville NY,; 20 pages; Oct. 1977.

Vadapalli; Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.

Van Der Linden et al.; Three-Dimensional Analysis of Dental Casts by Means of the Optocom; Journal of Dental Research; 51(4); p. 1100; Jul.-Aug. 1972.

Van Der Linden; A New Method to Determine Tooth Positions and Dental Arch Dimensions; Journal of Dental Research; 51(4); p. 1104; Jul.-Aug. 1972.

Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.

Varady et al.; Reverse Engineering Of Geometric Models' An Introduction; Computer-Aided Design; 29(4); pp. 255-268; 20 pages; (Author Manuscript); Apr. 1997.

Verstreken et al.; An Image-Guided Planning System for Endosseous Oral Implants; IEEE Transactions on Medical Imaging; 17(5); pp. 842-852; Oct. 1998.

Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.

Warunek et.al.; Clinical Use of Silicone Elastomer Applicances; JCO; 23(10); pp. 694-700; Oct. 1989.

Watson et al.; Pressures recorded at te denture base-mucosal surface interface in complete denture wearers; Journal of Oral Rehabilitation 14(6); pp. 575-589; Nov. 1987.

Wells; Application of the Positioner Appliance in Orthodontic Treatment; American Journal of Orthodontics; 58(4); pp. 351-366; Oct. 1970.

Wikipedia; Palatal expansion; 3 pages; retrieved from the internet (https://en.wikipedia.org/wiki/Palatal_expansion) on Mar. 5, 2018.

Williams; Dentistry and CAD/CAM: Another French Revolution; J. Dent. Practice Admin.; 4(1); pp. 2-5 Jan./Mar. 1987.

Williams; The Switzerland and Minnesota Developments in CAD/CAM; Journal of Dental Practice Administration; 4(2); pp. 50-55; Apr./Jun. 1987.

Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.

Witt et al.; The wear-timing measuring device in orthodontics-cui bono? Reflections on the state-of-the-art in wear-timing measure-

(56) References Cited

OTHER PUBLICATIONS ment and compliance research in orthodontics; Fortschr Kieferorthop.; 52(3); pp. 117-125; (Translation Included) Jun. 1991.
Wolf; Three-dimensional structure determination of semi-transparent objects from holographic data; Optics Communications; 1(4); pp. 153-156; Sep. 1969.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yamada et al.; Simulation of fan-beam type optical computed-tomography imaging of strongly scattering and weakly absorbing media; Applied Optics; 32(25); pp. 4808-4814; Sep. 1, 1993.
Yamamoto et al.; Optical Measurement of Dental Cast Profile and Application to Analysis of Three-Dimensional Tooth Movement in Orthodontics; Front. Med. Biol. Eng., 1(2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.
Yoshii; Research on a New Orthodontic Appliance: The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164; 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Grove et al.; U.S. Appl. No. 15/726,243 entitled "Interproximal reduction templates," filed Oct. 5, 2017.
Kopelman et al.; U.S. Appl. No. 16/152,281 entitled "Intraoral appliances for sampling soft-tissue," filed Oct. 4, 2018.
Morton et al.; U.S. Appl. No. 16/177,067 entitled "Dental appliance having selective occlusal loading and controlled intercuspation," filed Oct. 31, 2018.
Akopov et al.; U.S. Appl. No. 16/178,491 entitled "Automatic treatment planning," filed Nov. 1, 2018.
Elbaz et al.; U.S. Appl. No. 16/198,488 entitled "Intraoral scanner with dental diagnostics capabilities," filed Nov. 21, 2018.
O'Leary et al.; U.S. Appl. No. 16/195,701 entitled "Orthodontic retainers," filed Nov. 19, 2018.
Shanjani et al., U.S. Appl. No. 16/206,894 entitled "Sensors for monitoring oral appliances," filed Nov. 28, 2019.
Shanjani et al., U.S. Appl. No. 16/231,906 entitled "Augmented reality enhancements for dental practitioners." Dec. 24, 2018.
Kopleman et al., U.S. Appl. No. 16/220,381 entitled "Closed loop adaptive orthodontic treatment methods and apparatuses," Dec. 14, 2018.
Sabina et al., U.S. Appl. No. 16/258,516 entitled "Diagnostic intraoral scanning" filed Jan. 25, 2019.
Sabina et al., U.S. Appl. No. 16/258,523 entitled "Diagnostic intraoral tracking" filed Jan. 25, 2019.
Sabina et al., U.S. Appl. No. 16/258,527 entitled "Diagnostic intraoral methods and apparatuses" filed Jan. 25, 2019.

\* cited by examiner

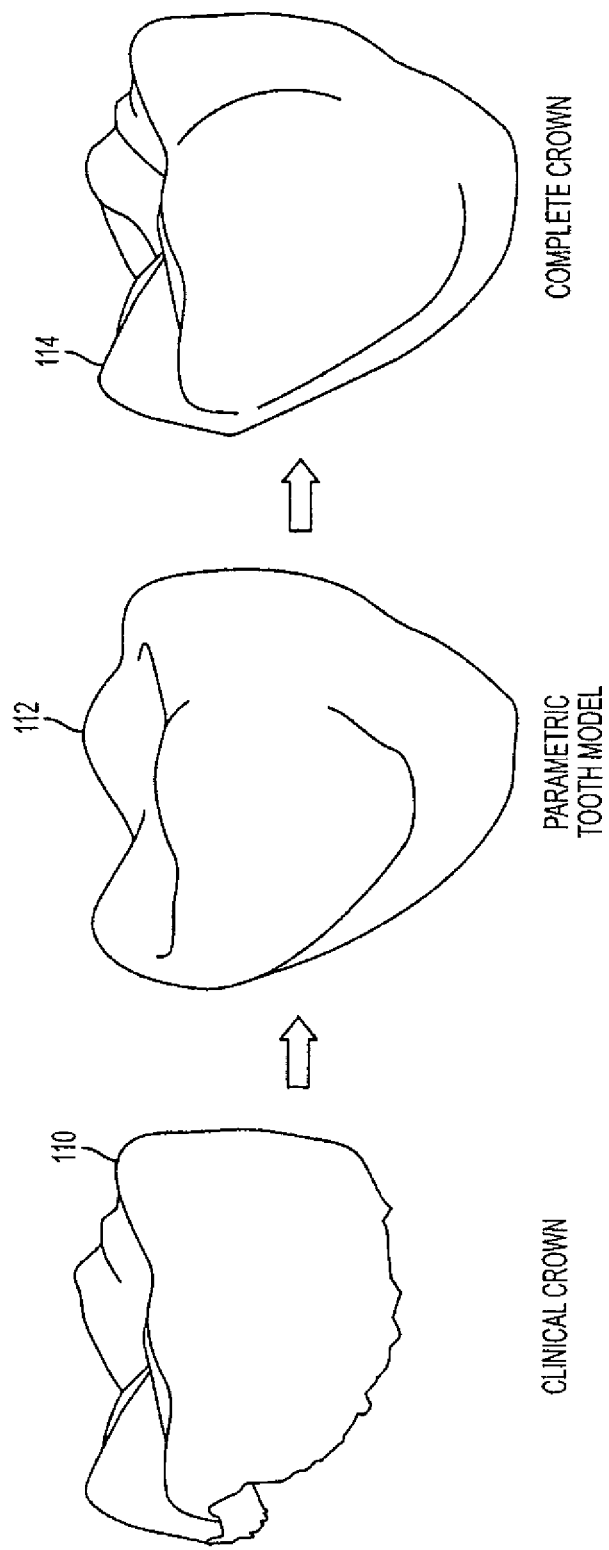

RECONSTRUCTION OF NON-VISIBLE PART OF TOOTH

CROSS-REFERENCE TO RELATED APPLICATIONS

This application is a continuation of U.S. patent application Ser. No. 13/362,997, filed Jan. 31, 2012, which will issue as U.S. Pat. No. 8,639,477 on Jan. 28, 2014, which is a continuation of U.S. patent application Ser. No. 12/055,192, filed Mar. 25, 2008, now U.S. Pat. No. 8,108,189 the entire contents of which are hereby incorporated by reference.

BACKGROUND

1. Field of the Invention

The present invention relates, generally, to dental and/or orthodontic treatment, and in particular to a system and method for modeling a complete tooth of a patient to facilitate dental and/or orthodontic treatment.

2. Related Art

Current techniques for impression-based computational orthodontics are based on impressions, three dimensional (3-D) radiographic scans or 3-D x-rays of teeth, which capture the surface of the teeth. Unfortunately, when two or more teeth are in close proximity, the digital data representing surfaces of the individual teeth are difficult to separate when using these techniques. The same problem exists for "unerupted" teeth, where the initial scan may capture only exposed portions of the teeth. The inability to account accurately for the interproximal and unerupted surfaces of the teeth means that aligners created based on the incomplete data may not properly fit in the areas that are later exposed either through eruption from the gingiva, uncrowding, or improved hygiene, which may firm up the gingival tissue and expose more tooth structure. An aligner that does not fit well becomes less effective in later stages of the orthodontic treatment. A poorly fitting aligner may also compromise the esthetics of the appliance, which in turn, may lead to suboptimal patient compliance in wearing the aligners.

SUMMARY

In accordance with various aspects of the present invention, a system and method are provided to account for the interproximal and unerupted surfaces of teeth ("invisible surfaces") that are partially blocked or unexposed in impressions, 3-D radiographic scans or 3-D X-rays to facilitate dental and/or orthodontic treatment.

Reconstruction of the invisible surfaces of the tooth surface is based on the visible or known surfaces. The reconstruction uses statistical preparation of a parametric tooth model, matching of the parametric model, and the final deformation step that guarantees the reconstructed model substantially follows the visible part and the transition area between known and reconstructed parts is anatomical.

In one aspect, a computer-implemented method is provided for modeling a complete tooth of a patient to facilitate dental and/or orthodontic treatment. The method includes generating a first set of digital data representing a clinical crown; generating a second set of digital data representing a plurality of digital tooth models of a particular tooth type each having a first parameterization; processing the second set of digital data to obtain a third set of digital data representing an average tooth model of the particular tooth type having a second parameterization which is less than the first parameterization; fitting the third set of digital data to the first set of digital data to create a set of digital data representing an interim tooth model; and morphing the set of digital data representing the interim tooth model to substantially mimic the anatomical shape of the clinical crown of the first set of digital data.

The suggested solution is stable with respect to minor impurities in the input data and sufficiently fast to be used in interactive mode.

This brief summary has been provided so that the nature of the invention may be understood quickly. A more complete understanding of the invention may be obtained by reference to the following detailed description in connection with the attached drawings.

BRIEF DESCRIPTION OF THE DRAWINGS

The foregoing features and other features of the present invention will now be described with reference to the drawings. In the drawings, the same components have the same reference numerals. The illustrated embodiment is intended to illustrate, but not to limit the invention. The drawings include the following Figures:

FIG. 1B illustrates graphically the implementation of the process of FIG. 1A in accordance with an embodiment of the present invention;

DETAILED DESCRIPTION

Figure 1A:
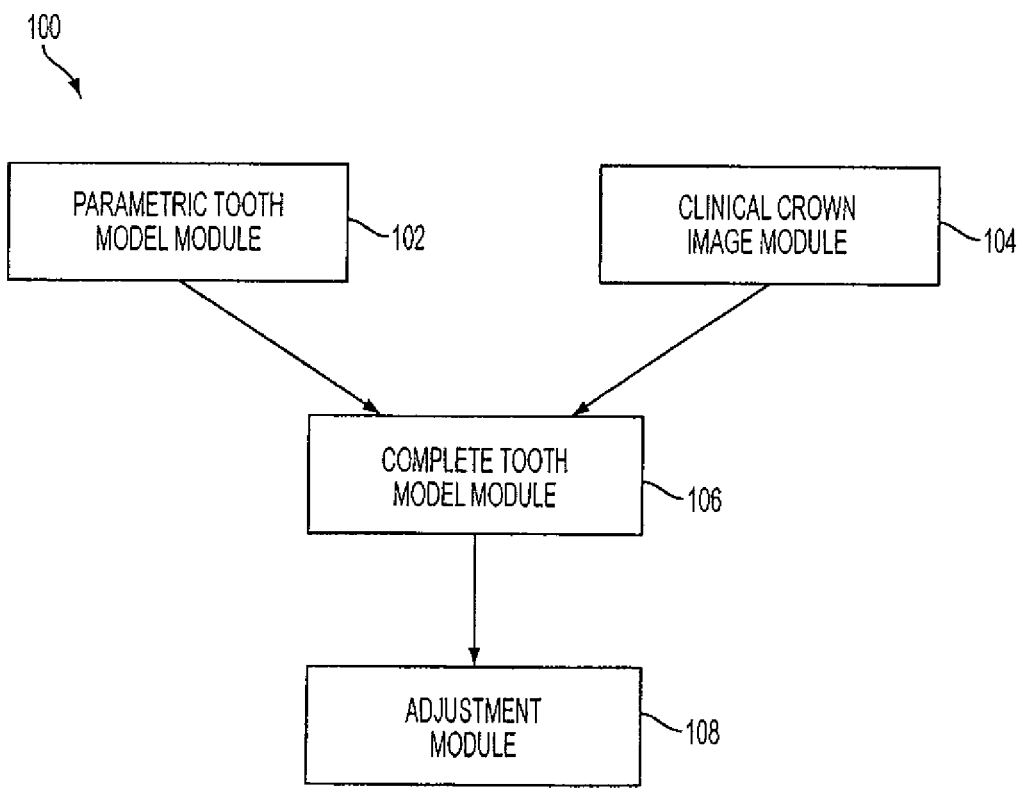
FIG. 1A is a flow diagram of a process for creating a complete tooth model from tooth images of teeth having partially blocked or unexposed surfaces in accordance with an embodiment of the present invention.

The present invention may be described herein in terms of various components and processing steps. It should be appreciated that such components and steps may be realized by any number of hardware and software components configured to perform the specified functions. For example, the present invention may employ various electronic control devices, visual display devices, input terminals and the like, which may carry out a variety of functions under the control of one or more control systems, microprocessors or other control devices.

In addition, the present invention may be practiced in any number of orthodontic or dental contexts and the exemplary embodiments relating to a system and method for modeling of complete tooth of a patient as described herein are merely a few of the exemplary applications for the invention. For example, the principles, features and methods discussed may be applied to any orthodontic or dental treatment application or process.

For illustrative purposes, the various exemplary methods and systems may be described in connection with a single tooth of a patient; however, such exemplary methods and systems may be implemented on more than one tooth and/or all teeth within a patient, such as molars, bicuspids, canines, incisors or any other teeth. For example, the exemplary methods and systems may be implemented by performing a particular process, operation or step on one or more teeth before proceeding to a subsequent process, operation or step, or by performing all or essentially all processes, operations or steps on a particular tooth before proceeding to another tooth, or any combination thereof.

Such modeling techniques may be conducted with one or more computer-based systems, such as systems configured for storing actual patient data and generic tooth data, morphing generic tooth data to such patient's data and/or facilitating additional orthodontic treatment applications, through the use of one or more algorithms.

The part of the tooth surface, which is visible in usual conditions, is called a "clinical crown" of the tooth. The present invention uses the known surfaces of the clinical crown to predict the unknown surfaces of the "invisible" or unseen part of the tooth.

In orthodontic applications, knowing the shape of the invisible parts of a tooth surface is important for esthetic reasons. For example, during the orthodontic treatment, the teeth are moving from their initial position to the final position. In final position, the initially invisible surfaces of the tooth may become visible. Thus, in order to predict the appearance of the whole jaw in the final position, the shape of the initially invisible surfaces is desired.

In addition, knowing the shape of the invisible parts of the tooth surface is important for tooth movements, since the interproximal surfaces of the tooth impose certain restrictions on tooth movements. These restrictions stem from the fact that the teeth are not allowed to "dive" into other teeth while moving from their initial to final position. To ensure that a treatment plan does not break these restrictions, the shape of the tooth in the interproximal areas should be known.

For makers of tooth related aligners and treatments, the shape of the invisible part of the tooth is of special interest, since in order to produce an appropriate aligner, the shape of the entire surface of a tooth during a given treatment stage should be known.

FIG. 1A illustrates a computer-implemented process 100 for modeling a complete tooth of a patient to facilitate dental and/or orthodontic treatment in a digital format from clinical crown images that are created from teeth having partially blocked or unexposed surfaces in accordance with the present invention.

In one embodiment, process 100 includes a parametric tooth model module 102 (hereinafter "module 102") for creating a digital data set representing a parametric tooth model 112 (FIG. 1B) from a set of etalon teeth. As defined herein, etalon teeth are reference teeth, manually prepared, or by other means, where all teeth of a particular type of tooth (e.g. incisor, canine) have substantially the same surface parameterization. Process 100 also includes clinical crown image module 104 (hereinafter "module 104") for creating a digital data set representing a surface image of a clinical crown 110 (FIG. 1B) of a patient with an incomplete surface portion. Incomplete tooth model module 106 (hereinafter "module 106") the parametric tooth model data set 112 generated in module 102 is fit to the patient's incomplete surface image data set 110 generated in module 104 to yield a complete tooth image data set 114.

In one embodiment, further adjustment of the complete tooth image may be provided through adjustment module 108. For example, the transition zone between the clinical crown and the generic tooth model may require "smoothing," as described in more detail below, so as to yield a tooth shape on complete tooth model which more closely approximates the clinical crown.

Figure 1C:
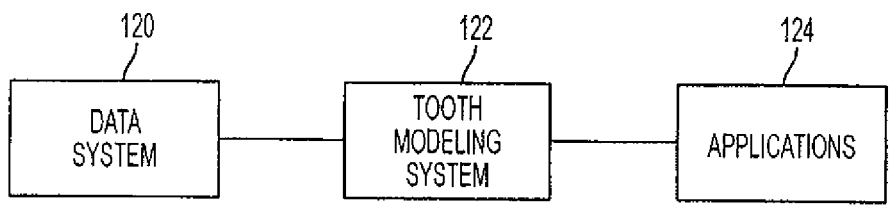
FIG. 1C illustrates a system for implementing the process of FIG. 1A in accordance with an embodiment of the present invention.

As shown in FIG. 1C, exemplary modeling methods of the present invention may be conducted with one or more computer-based systems, for example, a system 120 configured for storing patient data and generic tooth data. Also, a tooth modeling system 122 configured for executing module 102 and module 104 and for merging data and information generated from modules 102 and 104 to generate complete tooth model in module 106. A system 124 may be configured for facilitating any other conventional orthodontic treatment applications, such as methods or processes for tracking teeth movement and position, evaluating gingival effects, or any other orthodontic treatment process from pre-treatment to final stages, or any stages in between.

Systems 120, 122 and/or 124 may include one or more microprocessors, memory systems and/or input/output devices for processing modeling data and information. To facilitate modeling of a patient crown, tooth modeling system 120 may include one or more software algorithms configured for generating a complete tooth model and/or performing other functions set forth herein.

There are established techniques which may be used to obtain a 3D model of the clinical crown. Referring again to FIG. 1A, in module 104, data sets representing a patient's tooth crown may be generated by various techniques for creating a clinical crown image, such as those disclosed in U.S. Pat. No. 6,685,469, assigned to Align Technology, Inc. (the "'469 Patent"), herein incorporated by reference, in its entirety, for all purposes, or such modeling processes known and provided under the brands INVISALIGN® and CLINCHECK® that are available from Align Technology, Inc. of San Jose, Calif.

Figure 2:
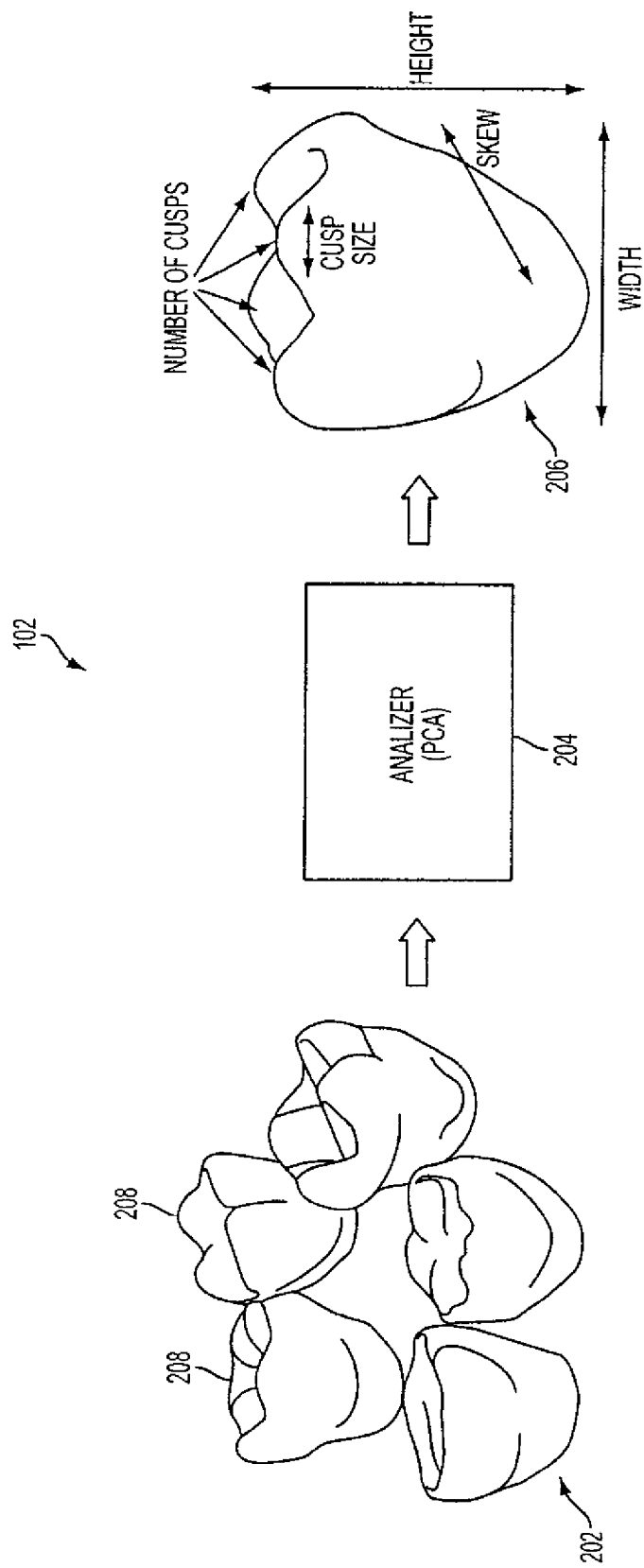
FIG. 2 is an illustration of the process of the parametric tooth model module in accordance with an embodiment of the present invention.

Referring to FIGS. 1A and 2, since human teeth show a high variety of shapes, module 102 provides a parametric model creation 206 which captures the high variety in a minimal number of numerical parameters. Thus, a large set of etalon teeth 202 is provided, which includes a large enough number of reconstructed teeth samples for representing as many tooth variations as possible. In module 102, a generic set of etalon teeth 202 are collected of each type of tooth. The set of etalon teeth 202 typically represents the same type of tooth (e.g. molar, canine, bicuspid, incisor and the like) as the clinical crown image it is intended to model, and may also be the same numbered tooth as the actual patient tooth, using conventional tooth numbering and identification systems. The set of etalon teeth 202 may be scanned using well known destructive scanning techniques to provide the digital data representing the surface geometry of each tooth in the set.

The surface of each etalon tooth 208 may be represented by a triangular mesh, denoted as Mesh below. In one embodiment, the Mesh satisfies at least the following conditions: 1) topological equivalence to a sphere (Euler number=F−E+V=2, where F, E, V are the numbers of faces, edges and vertices in the Mesh, respectfully); and 2) no self-intersections. Thus, parametric tooth model 206 is a map:

$$M: (t, U, \alpha_i) \rightarrow \text{Mesh}$$

where t is a translation vector, U is a pure rotation, and $\alpha_i$, i=0, 1, ... M are parameters describing the shape of parametric tooth model 206 (hereinafter "modes").

Once the surface representation is complete, parametric tooth model 206 may be obtained by analyzing the set of etalon teeth 202 provided using, for example, a Principal Components Analysis (PCA) technique 204 or a similar numeric technique. In one embodiment, the parameterization accomplished using PCA technique 204 allows description of any tooth with maximum accuracy using only a small number of parameters.

To begin PCA technique 204, the sample tooth set E is created which satisfies at least the following conditions: 1) all teeth shapes have the same number of vertices; and 2) corresponding shape vertices are located in similar positions.

The number of vertices in the Mesh is denoted as M. Each tooth shape may then be treated as a vector of length 3M:

$$e = \{x_1, y_1, z_1, x_2, y_2, z_2, \ldots, x_M, y_M, z_M\}.$$

Given N sample teeth and renumbering items of the sample tooth vector from 1 to 3M, all samples may be described as a matrix:

$$E = \begin{pmatrix} e_{11} & e_{12} & \cdots & e_{1N} \\ e_{21} & e_{22} & \cdots & e_{2N} \\ \vdots & \vdots & \ddots & \vdots \\ e_{3M1} & e_{3M2} & \cdots & e_{3MN} \end{pmatrix}.$$

The modes, described above, allow the model shape to be varied. The modes are equivalent to the eigenvectors of the covariance matrix of the sample tooth set E. The significance of the modes is determined by corresponding eigenvalues—the higher the eigenvalue, the greater the mode significance.

The mean shape of the shapes from E are found by:

$$\bar{e}_j = \frac{1}{N} \sum_{i=1}^{N} e_{ij},$$

$$j = 1, \ldots, 3M.$$

Next, the matrix X of deviations of samples $e_i$ from the mean $\bar{e}$:

$$X = \begin{pmatrix} e_{11} - \bar{e}_1 & e_{12} - \bar{e}_1 & \cdots & e_{1N} - \bar{e}_1 \\ e_{21} - \bar{e}_2 & e_{22} - \bar{e}_2 & \cdots & e_{2N} - \bar{e}_2 \\ \vdots & \vdots & \ddots & \vdots \\ e_{3M1} - \bar{e}_{3M} & e_{3M2} - \bar{e}_{3M} & \cdots & e_{3MN} - \bar{e}_{3M} \end{pmatrix}.$$

The covariance matrix C is:

$$C = \frac{1}{N-1} X X^T.$$

Next, the eigenvectors and corresponding eigenvalues of the covariance matrix C may be found. Since the size of covariance matrix C in this example, is 3M×3M and since 3M>>N, the evaluation of eigenvectors and eigenvalues can be very time and memory consuming. Thus, to reduce time and memory consumption, the eigenvectors $v'_i$ and eigenvalues $\lambda_i$ of the matrix:

$$C' = \frac{1}{N-1} X^T X$$

may be solved, and the eigenvectors $v_i$ of covariance matrix C may be determined using the formula:

$$v_i = \frac{1}{\sqrt{\lambda_i}} X v'_i.$$

The variable v is an eigenvector of covariance matrix C:

$$Cv = \frac{1}{\sqrt{\lambda}} (XX^T)(Xv') = \frac{1}{\sqrt{\lambda}} X(X^T X) v' = \frac{1}{\sqrt{\lambda}} X C' v' = \sqrt{\lambda} X v' = \sqrt{\lambda} v.$$

Note that covariance matrix C has 3M eigenvalues and eigenvectors, while the Matrix C' has only N. The N eigenvalues (along with their eigenvectors) correspond to the N largest eigenvalues. All other eigenvalues of C are equal to 0. Orthogonal eigenvectors of C' are determined using standard mathematical algorithms. Eigenvectors of C formed using multiplication on X are also orthogonal as shown by:

$$v'^T_i v'_j = 0,$$

then $$v^T_i v_j = \frac{1}{\sqrt{\lambda_i \lambda_j}} v'^T_i (X^T X) v'_j = \sqrt{\frac{\lambda_j}{\lambda_i}} v'^T_i v'_j = 0.$$

It is clear that v has unit norm if v' has unit norm.

Now, given N eigenvectors, some may be selected as modes. The eigenvectors may be rearranged in order of decreasing eigenvalues and $g_i$ is computed:

$$g_i = \frac{\sum_{j=1}^{i} \lambda_j}{\sum_{k=1}^{N} \lambda_k} \times 100\%.$$

Then select first L, (1<L<N) eigenvectors so that the $g_L$ is above some threshold, for example, $g_L \geq 95\%$.

Although eigenvectors are orthogonal to each other, they are not orthogonal to the mean vector. Thus, it is possible for an eigenvector to have translation or rotation components, such that addition of the eigenvector to the mean is equivalent to some global translation or rotation of the mean shape.

Therefore, prior to filling matrix X for each sample tooth j, the best global scale $S_j$ and rigid transform $(U_j, t_j)$ is found for the mean that makes matrix X similar to the sample tooth using a minimization task:

$$\min_{T_j} \sum_i (T_j(\bar{r}_i) - r_{ij})^2 = \min_{s_j U_j, t_j} \sum_i (s_j U_j \bar{r}_i + t_j - r_{ij})^2,$$

where $\bar{r}_i$ is a vertex of the mean shape and $r_{ij}$ is a vertex of j-th sample tooth. The solution of the task for searching of the rigid transformation in closed form is well known and it may be freely generalized to a rigid+scale transformation.

Given transforms $T_j$, the matrix X may be redefined as:

$$X = \begin{pmatrix} r_{11} - T_1(\bar{r}_1) & r_{12} - T_2(\bar{r}_1) & \ldots & r_{1N} - T_N(\bar{r}_1) \\ r_{21} - T_1(\bar{r}_2) & r_{22} - T_2(\bar{r}_2) & \ldots & r_{2N} - T_N(\bar{r}_2) \\ \vdots & \vdots & \ddots & \vdots \\ r_{M1} - T_1(\bar{r}_M) & r_{M2} - T_2(\bar{r}_M) & \ldots & r_{MN} - T_N(\bar{r}_M) \end{pmatrix}$$

where each row contains vectors in cells and is treated as 3 ordinary rows.

Two viewpoints exist on how to limit the value of modes ($\alpha_i$). From a probabilistic viewpoint, the probability of x (it's a vector collecting positions of all the mesh vertices) to be a tooth from normal distribution with the mean vector $\bar{e}$ and covariance matrix C is:

$$p \sim \exp\left[-\frac{1}{2}(x - \bar{e})^T C^{-1}(x - \bar{e})\right].$$

The expression may be used to filter out completely improbable teeth shapes. For example, a constant $c_1 \approx 10$ may be selected and only shapes satisfying the following equation are of interest:

$$(x - \bar{e})^T C^{-1}(x - \bar{e}) \leq c_1.$$

Taking the decomposition of $x - \bar{e}$ in basis formed from eigenvectors of matrix C:

$$x - \bar{e} = \sum_i \alpha_i v_i$$

and substituting it in the above equation yields:

$$\sum_i \frac{\alpha_i^2}{\lambda_i} \leq c_1. \quad (1)$$

In particular it gives:

$$\alpha_i \leq \sqrt{c_1 \lambda_i}.$$

Thus, if all the parameters $\alpha_i$ are within these limits, then the resulting linear combination of the corresponding eigenvectors and the mean tooth $$\left(\bar{e} + \sum_i \alpha_i v_i\right)$$

will give some probable shape of the tooth. Other values of $\alpha_i$ can be freely disregarded during tooth reconstruction.

From the Mesh degradation viewpoint, typically, the modes $\alpha_i$ are small corrections to the average shape. However, selecting $\alpha_i$ too large creates a large deviation from the average shape, which may cause the output shape to have large self-intersections, which are hard to resolve.

Thus, boundary values for parameters $\alpha_i$ are created to avoid undesirable self-intersections. Assuming the average shape does not include self-intersections, the following procedure is provided for detecting boundary values. The mode scales are limited to the values at which every face of the model changes its area and its normal, but not significantly relative to the face of average shape.

In this procedure, f is a face of the average shape E, and $S(f, \alpha)$ is a vector with the direction of the normal to the face and magnitude equal to the area of the face for the given mode parameters $\alpha_i$. Since, translation and rotation parameters do not affect face area, S is a quadratic function of $\alpha$. Here, $S(f) = S(f, (1, 0, \ldots, 0))$ and boundary value $A_i$ is selected such that for any $|\alpha_i| \leq A_i$ the following equation holds:

$$\min_{f \in E} \frac{S(f)^T S(f, (1, 0, \ldots, \alpha_i, \ldots, 0))}{S^2(f)} \geq c$$

$$0 < c < 1.$$

Accordingly, this ensures that any face of the shape will not decrease its area lower than c-fraction of initial area while being affected by the change of the parameter $\alpha_i$ in the allowed range. This means, geometrically, that points of the face f are not too near to each other, which has been found to substantially lower the probability of self-intersections. To find $A_i$ a quadratic equation is solved for each models' face, then a global minimum may be found.

Referring again to FIG. 2, as a result of the analysis using PCA technique 204, the parametric model tooth mesh 206 is created. The parameters, may include, but are not limited to, number of cusps, cusp size, skew, height and width.

Once the tooth model mesh 206 has been created, tooth model mesh 206 (E(t,U,$\alpha$)) is fit to the original clinical crown mesh C which includes selecting parameters (t,U,$\alpha$) of tooth model mesh 206 in such a way that a certain "distance" between the model mesh 206 and clinical crown mesh C is minimal.

Figure 3:
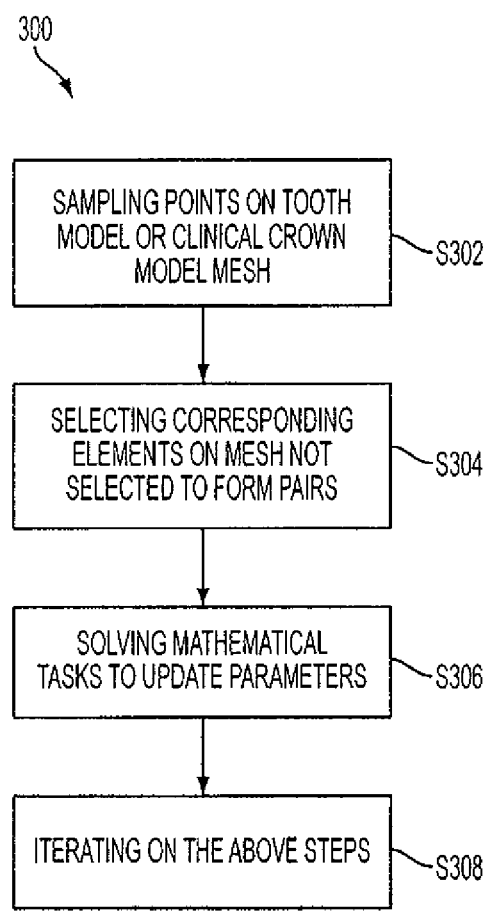
FIG. 3 is a flow diagram illustrating a computer-implemented process for fitting a tooth model to a clinical crown in accordance with an embodiment of the present invention.

As shown in FIG. 3, in one embodiment, process 300 of fitting tooth model mesh 206 to clinical crown mesh C includes the following stages: sampling (choosing) points on the surfaces of either tooth model mesh 206 or clinical crown mesh C (s302), selecting corresponding elements (points or faces) on the other mesh surface to form point pairs (s304), solving mathematical tasks which update the parameters bringing corresponding elements closer (minimizing the distance) (s306) and repeatedly iterating on the steps above (s308) to arrive at a coupling of the corresponding elements that minimizes the distance between the point pairs.

Figure 4:
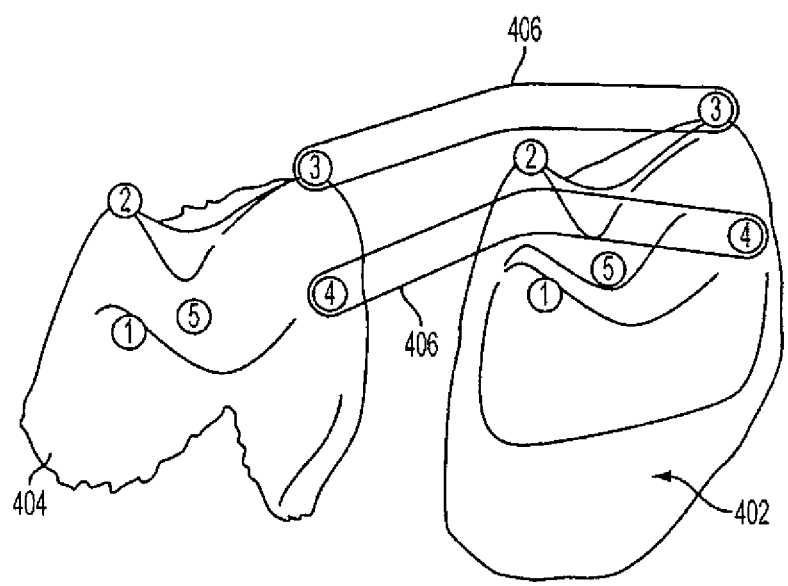
FIG. 4 is an illustration of corresponding point pairs on the tooth model and clinical crown in accordance with an embodiment of the present invention.

In step s302, as shown in FIG. 4, given tooth surface 402 of tooth model mesh 206 and clinical crown surface 404 from clinical crown mesh C, the surfaces 402 and 404 are "replaced" by approaching or converging sets of point pairs 406. Point pairs 406 may represent sufficiently details of surfaces 402 and 404. As described below, adequate coupling of point pairs 406 causes point pairs 406 to be located nearer relative to their present location in the iterative process when surfaces 402 and 404 are fitted together.

Although surfaces 402 and 404 may be processed simultaneously, in one embodiment, points are sampled on one of surfaces 402 or 404. In one embodiment, sampling proceeds by choosing distinguished points on the surfaces. For example, distinguished points may include the vertices of the triangular mesh thus created. In some embodiments, a weighting factor may be assigned to each point, such that the more weight assigned to a particular point the closer the point must approach the corresponding point on the other mesh. In one embodiment, for example, the weighting of a vertex may be made equal to the summed area of all faces incident to the vertex.

Introduction of point weighting alleviates problems that may arise due to nonuniformity of the mesh density—high and low densities of triangular elements. Thus, high density areas receive no advantage in matching over lower density areas.

The time of computation is dependent on the total number of points, thus to limit computation time, certain non-uniform vertices on the mesh may be eliminated. To simplify the mesh and bring the mesh density closer to uniformity, a decimation or simplification operation may be used to replace several vertices with one. One particular decimation method, such as collapsing of the shortest edge until its size is less than a threshold, provides fast and accurate performance.

Figure 5:
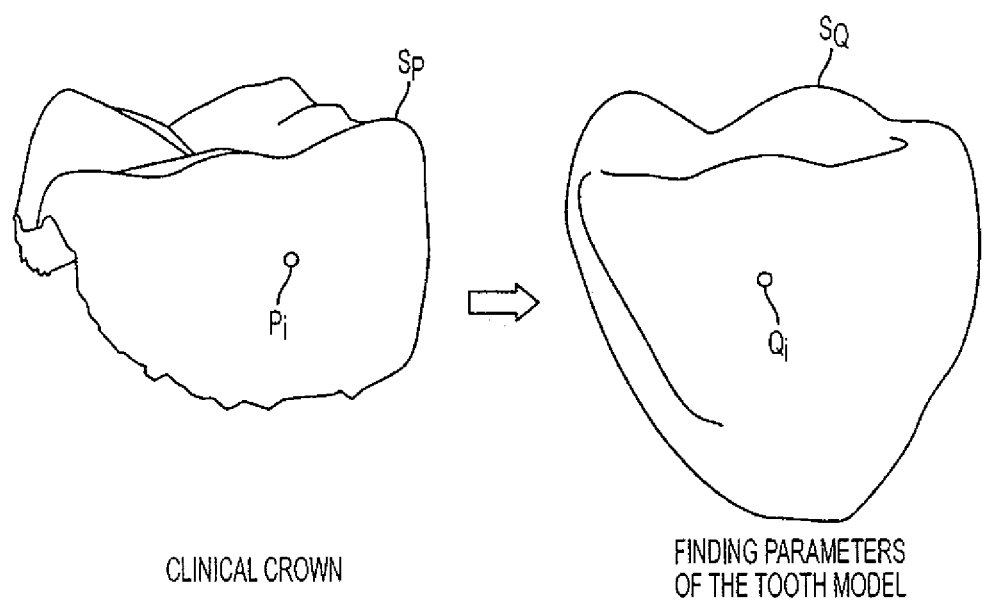
FIG. 5 is an illustration of surfaces of the tooth model and clinical crown in accordance with an embodiment of the present invention.

As a result of step s302, as shown in FIG. 5, a set of points $P_i$ from surface $S_P$ of either model tooth surface 404 or clinical crown surface 402 is created. In step s304, point pairs 306 ($P_i Q_i$) may be created by selecting appropriate points on surface $S_Q$.

In one embodiment, finding Q, involves taking the nearest point from the other surface:

$$Q = \underset{S_Q}{proj} P$$

Alternatively, finding Q involves taking the point of intersection of a line passing though point P with the direction given by the normal to $S_P$ at P.

$$Q \in S_Q \cap line(P, n_P).$$

Despite seeming different the ways have a similarity that the line connecting P and Q is orthogonal to either of surfaces (orthogonal to $S_P$ in the case of projection, orthogonal to $S_Q$ in the case of line intersection). Also in the case of line intersection P can be the nearest point to Q with sufficiently high probability: namely if P is located on the convex part of the surface (if viewing from Q).

In the process 300 of fitting the tooth model to the clinical crown, it may happen that certain regions (root, interproximal area) on the tooth model may have no corresponding regions on the clinical crown, which creates an error that affects the fitting if some pairs are formed for that region. If the clinical crown surface is initially chosen for point sampling (s302) then these regions are ignored automatically. Otherwise, if points are sampled on the tooth model, explicit filtering of the pairs may be needed.

Figure 6:
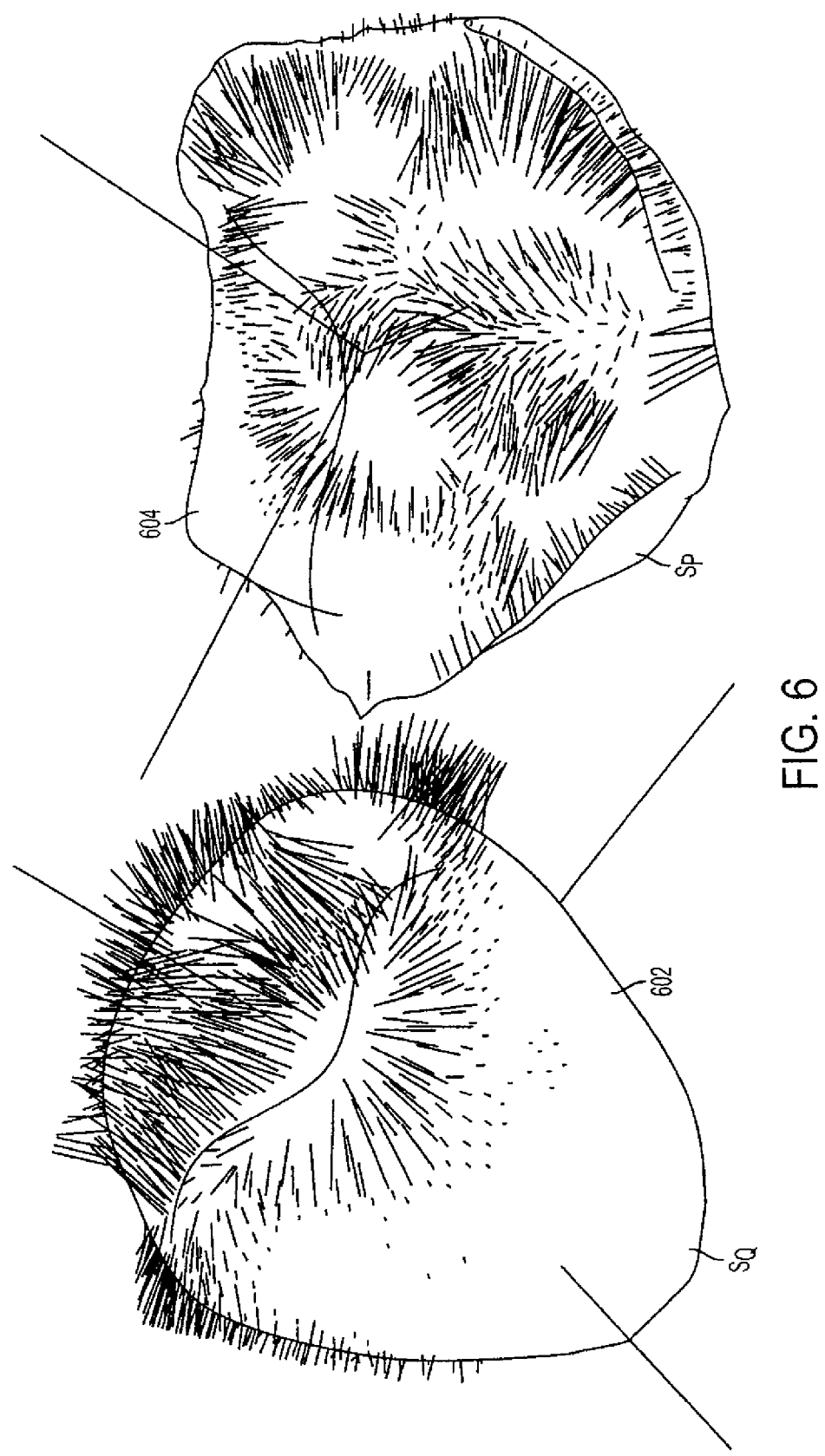
FIG. 6 is an illustration of pairs formed using projections in accordance with an embodiment of the present invention.

FIG. 6 is an illustration of an embodiment, in which tooth model 602 is sampled and projections are found on clinical crown 604. The filtering of point pairs may be governed by the following: 1) If P is projected on the boundary of the clinical crown 604, the pair is rejected; 2) considering the vector $d=(-1)^s(P-Q)$, with its direction chosen so that the scalar product of d and the normal to $S_Q$ at Q is a positive value, if the angle between d and the normal to P at $S_P$ is larger than a certain threshold, for example, 60°, the pair is discarded; and 3) considering the distanced $\|d\|$ between the points of a pair in comparison with the root-mean-square distance $\bar{d}$ of all the pairs before filtering, if $\|d\| > \sigma_0 \bar{d}$, the pair is rejected (3-sigma rule). The filtering process allows precise "projectors" and "intersectors" to be replaced with faster approximation methods.

After each point on one mesh surface receives a corresponding point on the other mesh surface, transformations are made that match the points of each pair together according to their weights. In one embodiment, point-to-point matching is used. In this embodiment, a set of pairs may be denoted as ($P_i$, $Q_i$), the weight as $w_i$, and the parameterized transformation as T. The functional below is minimized:

$$\min_T \sum_i w_i \|P_i - T(Q_i)\|^2. \qquad (2)$$

However, recall that the points are not isolated but represent meshes and several iterations may have to be done in order to achieve the best fitting. Accordingly, the same sample points may probably be chosen on subsequent iterations and correspondences are received by projecting them on the other mesh. If the transformation found on the current iteration is small enough which is a typical case in the iteration process, then the projections of the sample points with high probability fall on the same faces as on the current iteration, or may be on the neighboring faces which have similar directions of normals. To facilitate the process, a point-to-plane transformation may be used where each face may be extended to the plane containing it to find the transformation minimizing distances of the sample points to these planes. In principle, point-to-planes matching increases the speed of convergence process because each iteration of point-to-planes matching is roughly equivalent to several iterations of point-to-point matching. Consequently, much lesser number of timely projections on a mesh must be computed. For this reason, in some embodiments, point-to-point matching may be used alone or in conjunction with point-to-planes matching.

In steps s306, after pairs of corresponding points on the surfaces of tooth model 602 and clinical crown 604 are formed, the transformation is performed that brings the two surface meshes 602 and 604 together. The 3D transformations that may be used include:

Translation $$P=T_t(Q)=Q+t. \quad (4)$$

Rigid-body transformation $$P=T_{U,t}(Q)=UQ+t, \; UU^T=I. \quad (5)$$

Rigid-body transformation with scaling $$P=T_{U,t}(Q)=sUQ+t, \; UU^T=I. \quad (6)$$

Reflection relative to a line $$P=T_{t,n}(Q)=2(t+(Q^Tn)n)-Q, \; n^2=1, \; t-(t^Tn)n=0, \quad (7)$$

where n is a unit directional vector of the line, t—point on the line nearest to the origin.

Reflection relative to a plane $$P=T_{d,n}(Q)=Q+2(d-Q^Tn)n, \; n^2=1, \quad (8)$$

where n is a unit normal to the plane, d—signed distance from the plane to the origin.

Given pairs $\{P_i, Q_i\}$ the constrained least-squares problem equation (2) may be solved for any of the transformation groups.

Not only rigid transformation of the tooth model may be found with the generalization of equation (2), but also modes parameters $\alpha$. The concern at this point in process 300 is no longer 3D transformations, but with mapping from 3A-dimensional space to 3-dimensional space, where A is the number of modes.

Figure 7:
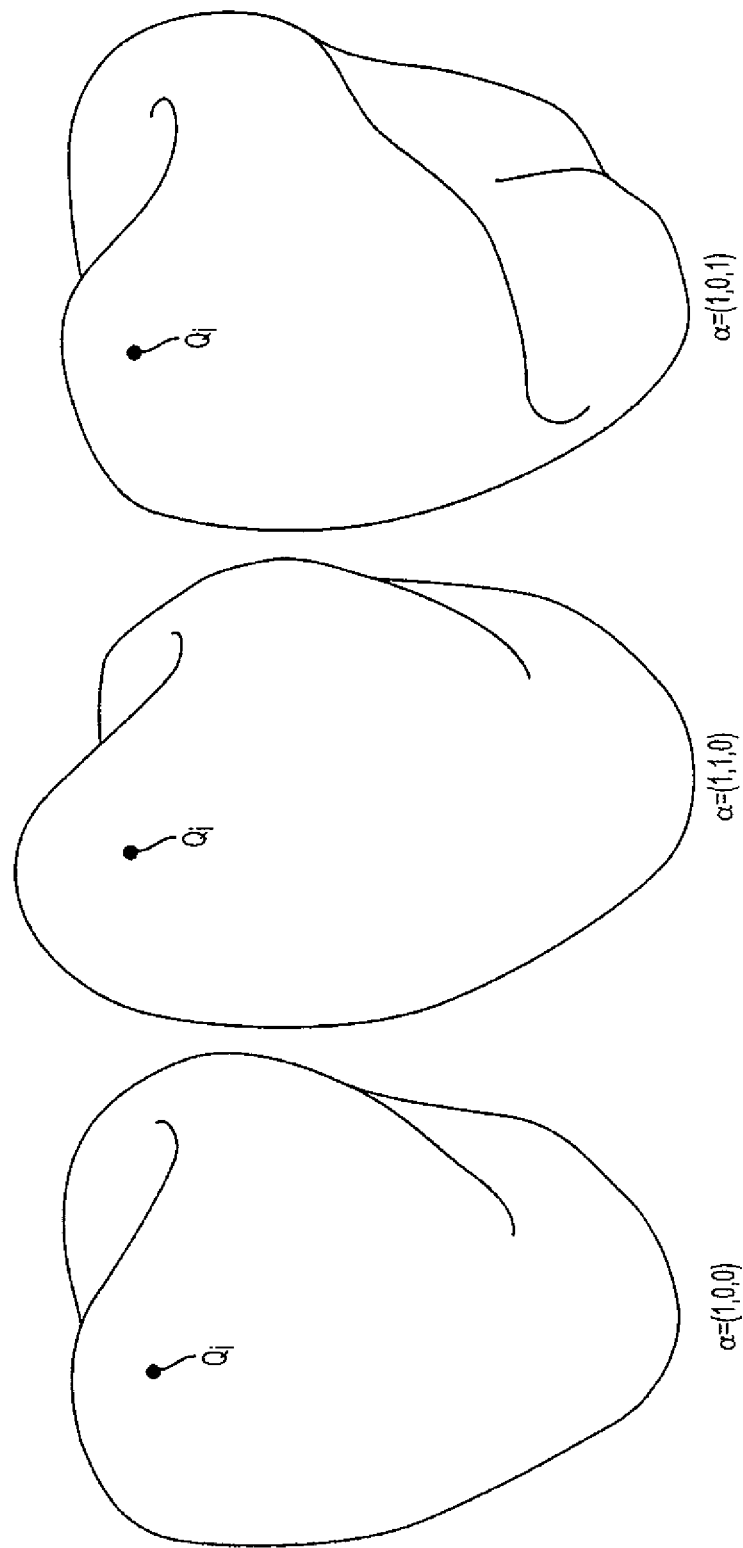
FIG. 7 is an illustration of mode fitting in accordance with an embodiment of the present invention.

In this example, as shown in FIG. 7, every mode may be considered a triangular mesh, each sharing the same topology. Thus, the model tooth is a linear combination of the mode meshes. Given point Q on the model tooth, the corresponding points of the mode meshes may be restored using the index of the triangle to which Q belongs. All points may be collected in 3×A matrix Q, then Q=Q$\alpha$.

Thus the functional to be minimized takes the form:

$$\min_{T,\alpha} \sum_i w_i \|P_i - T(Q_i\alpha)\|^2.$$

Here, T belongs to the class of rigid-body transformations (5). The functional may be rewritten using the property of orthogonal matrices: $x^2=(U^Tx)^2$:

$$\min_{U,t,\alpha} \sum_i w_i \|Q_i\alpha + U^Tt - U^TP_i\|^2.$$

The minimum may be found using some simplifications. The rotation around the axis, given by a unit vector r, on the angle $\varphi$ can be represented as:

$$U^TP=(rr^T)P+\cos\varphi(I-rr^T)P+\sin\varphi[P,r].$$

Thus, it is expected that the mapping changes are not significant and becomes less and less significant if convergence takes place, particularly the rotation. In the approximation of small angles: $\sin\varphi\approx\varphi$, $\cos\varphi\approx1$, action of the rotation matrix may be represented as:

$$U^TP\approx P+\varphi[P,r]=P+[P,\alpha]=P+\Omega(P)\alpha,$$

$$\alpha=\varphi r, \; \Omega(P)=\begin{bmatrix} 0 & -P_z & P_y \\ P_z & 0 & -P_x \\ -P_y & P_x & 0 \end{bmatrix}$$

Substituting $U^TP$ back into the functional, yields:

$$\min_{U,\alpha,t,a} \sum_i w_i \|Q_i\alpha + U^Tt - P_i - \Omega(P_i)\alpha\|^2.$$

Collecting all the variables in one vector $x=\{\alpha,\alpha\}$, and the coefficients in one matrix:

$$Q'_i [Q_i \Omega^T(P_i)] \in R^{3\times(A+3)}.$$

Thus, the simplified view of the functionals:

$$\min_{x,t} \sum_{i=1}^n w_i \|Q'_i x + U^Tt - P_i\|^2.$$

In one embodiment, it may be desired to set tooth orientation manually. Then T is taken from the class of translations (4). In that embodiment, the above form is valid if U=1, x=$\alpha$, Q'=Q. For the sake of brevity, the stroke next to Q is omitted.

Setting the derivative on $U^Tt$ to zero, yields:

$$t=U(<P>-<Q>x),$$

where:

$$<P>=W^{-1}\sum_{i=1}^n w_i P_i,$$

$$<Q>=W^{-1}\sum_{i=1}^n w_i Q_i,$$

$$W=\sum_{i=1}^n w_i.$$

Transforming over to a central coordinate system yields:

$$p_i=P_i-<P>, \; q_i=Q_i-<Q>,$$

then, the optimization task is simplified:

$$\min_x \sum_{i=1}^n w_i(q_i x - p_i)^2 = \min_x (x^T A x + 2b^T x + f),$$

$$A=\sum_{i=1}^n w_i Q_i^T Q_i - W^{-1} <Q>^T <Q>,$$

$$b=\sum w_i Q_i^T P_i - W^{-1} <Q>^T <P>.$$

Note, that the last three values of b is zero due to equation $\Omega(p_i)p_i=0$.

Using the equations above reduces the task of modes fitting to the minimum finding of a multivariate quadratic function. However, since the variables are not independent, they must satisfy the inequation (1). This inequation limits the modes parameters implying that they are added to the average tooth. During the fitting, the model tooth is allowed to scale entirely and the average tooth is considered as one of the modes with scale coefficient, thus (1) is generalized to:

$$\sum_{i=2}^{A} \frac{\alpha_i^2}{\lambda_i} \leq c_1 \alpha_1^2. \qquad (10)$$

Figure 8:
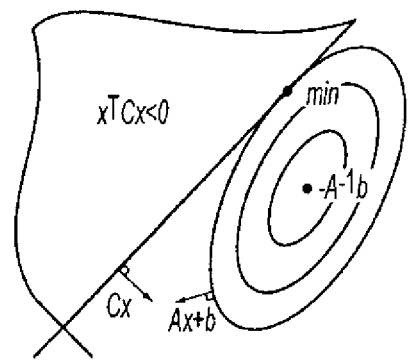
FIG. 8 is a schematic illustration of a solution to an algorithmic problem in accordance with an embodiment of the present invention.

As noted in FIG. 8, an observation about the inequation above is that it includes only squares of the variables. Thus, the mathematical problem may be stated as follows:

$$\min_{\vec{x}^T C \vec{x} \leq 0} (\vec{x}^T A \vec{x} + 2\vec{b}^T \vec{x}) \qquad (10)$$

where A—symmetric positive defined matrix n×n, C—diagonal matrix of the same size having values of different signs. More precisely C has only one negative element.

As a first step, the minimum of unconstrained problem $\vec{x} = -A^{-1}\vec{b}$ is taken. If it satisfies the condition $\vec{x}^T C \vec{x} \leq 0$, then the solution is found. Otherwise, find the minimum of $$\min_{\vec{x}^T C \vec{x} = 0} (\vec{x} A \vec{x} + 2\vec{b}^T \vec{x}), \qquad (11)$$

The problem may be solved using a Lagrange multipliers method. Setting derivatives equal to zero produces the system of equations:

$$A\vec{x} + \vec{b} - \mu C \vec{x} = 0,$$

$$\vec{x}^T C \vec{x} = 0. \qquad (12)$$

Then multiply the first row on $\vec{x}$ and take into account the second row:

$$\vec{x}^T A \vec{x} + \vec{b}^T \vec{x} = 0.$$

Substituting back in (11), from all the solutions $(\vec{x}, \mu)$ it is required to choose one that gives minimum to $\vec{b}^T \vec{x}$.

Making use of Holesky decomposition: $A = LL^T$, and changing the variables $\vec{y} = L^T \vec{x}$ in (12), denote $D = L^{-1}C(L^T)^{-1}$, $\vec{e} = L^{-1}\vec{b}$ as a result:

$$\vec{y} + \vec{e} - \mu D \vec{y} = 0,$$

$$\vec{y}^T D \vec{y} = 0. \qquad (13)$$

By construction the matrix D is also symmetric, and includes a full set of orthogonal eigenvectors $\{\vec{\omega}_i\}$, which are placed in the columns of $\Omega$:

$$D\Omega = \Omega \Lambda, \ \Omega \Omega^T = I, \ \Lambda = \text{diag}(\lambda_i).$$

Substitute in (13) $\vec{z}$ for $\Omega^T \vec{y}$:

$$\vec{z} - \mu \Lambda \vec{z} = -\vec{g}, \ (\vec{g} = \Omega^T \vec{e})$$

$$\vec{z}^T \Lambda \vec{z} = 0. \qquad (14)$$

Knowing that $-A^{-1}\vec{b}$ does not satisfy the condition $\vec{x}^T C \vec{x} \leq 0$, thus $$\vec{b}^T A^{-1} C A^{-1} \vec{b} > 0, \Leftrightarrow \vec{e}^T D \vec{e} > 0, \Leftrightarrow \vec{g}^T \Lambda \vec{g} > 0.$$

Substitution of the first row of (14) in the second gives $$0 = \vec{g}^T (\mu \Lambda - I)^{-1} \Lambda (\mu \Lambda - I)^{-1} \vec{g} = \sum_i \frac{\vec{g}_i^2 \lambda_1}{(\mu \lambda_i - 1)^2}$$

Consider the function $$f(\mu) = \sum_i \frac{\vec{g}_i^2 \lambda_i}{(\mu \lambda_i - 1)^2},$$

that has the solution among its roots. The interest is in the points where the gradient of $\vec{x}^T A \vec{x} + 2\vec{b}^T \vec{x}$ is directed oppositely to the gradient of $\vec{x}^T C \vec{x}$, that is $\mu < 0$, because if not, the source quadratic function is lesser inside the cone: $\vec{x}^T C \vec{x} < 0$.

Until now, the property that C has only one negative element, has not been used. It follows from the condition $\vec{g}^T \Lambda \vec{g} > 0$ that $f(0) > 0$. The application of Sylvester's law of inertia to D allows that among $\lambda_i$ there is exactly one negative eigenvalue $\lambda_-$. Therefore:

$$\lim_{\mu \to \lambda_-^{-1}} f(\mu) \to -\infty.$$

Because of one negative root $\mu$ always exists in the range $(\lambda_-^{-1}, 0)$. And if $\vec{g}^T \Lambda^{-1} \vec{g} > 0$, then there is the second negative root in the range $(-\infty, \lambda_-^{-1})$. The method of numerical root finding on these intervals is used to obtain the solution.

As soon as a new approximation of matching transformations is obtained, it is possible to form other pairs of points and repeat the process. However, another approach may be seen from a performance perspective. It is possible to leave one of the point sets intact and update only the other. In the case of saving Q, $P^{n+1}$ is obtained as the projections of Q on the surface $S_Q$. In the other case (P is unchanged), it is best to search $Q^{n+1} = \text{proj}_{S_Q} T^{-1}(P)$. Thus, there is no need to update search structures for $S_Q$ on every iteration.

Figure 9:
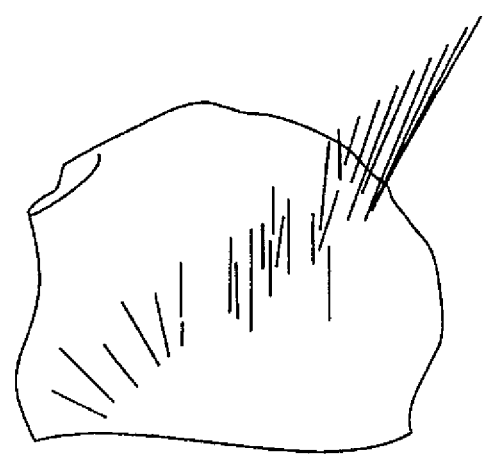
FIG. 9 is a simplified demonstration of an approximated projection on a surface of a point moving along a line from bottom-left in accordance with an embodiment of the present invention.

In one embodiment referring to FIG. 9, to accelerate the process, note that a replaced value of a point (let it be $P^n$) is a good initial approximation for the projection $P^{n+1}$, especially on the later iterations when the change in transformation is not significant. Instead of finding true projection of T(Q), find the nearest point to T(Q) on the face, containing $P_n$. If the point is not on the boundary of the face, take it as $P^{n+1}$. Otherwise inspect incident faces to that boundary point. During the inspection the nearest known point on $S_P$ to T(Q) is kept. The inspection stops as soon as the distance to projection approximation stops diminishing. In the case of convex surface $S_P$ from the point T(Q), the process converges to the nearest point. In the worst case when $P^{n+1} = P^n$, on the next iteration an attempt is made to bring together the same pairs of points, thus decreasing the convergence, but it in no way spoiling the currently known approximation of the transformation.

Practical experiments have shown that the best strategy is to interleave slow steps where pairs are fully updated (several such steps in series at the beginning and rarely later) with the fast steps when pairs are updated approximately and partially. Doing so makes it possible to achieve the same quality, as if repeating only slow steps, but on an order of magnitude faster.

To control convergence of the iterations, the value of the functional (2) must be watched. Unfortunately, control depends on the pairs selected and may occasionally rise if pairs of points are rebuilt completely. To overcome this, tight bounding box $B_Q$ may be built around surface $S_Q$ and watched at the corners. It may be shown that given two transformations $T_{1,2}$ from one of the groups above:

$$\max_{p \in S_Q} |T_1(p) - T_2(p)|$$

is not greater than the shift $T_1 - T_2$ of one of the corners of the bounding box. So watching the maximum shift of the corners may give a cue when to stop iterations.

Since the pairs selection depends on the model parameters, pairs matching may be used to the iterative procedure of consequent pairs selection and model update. An example of a pseudo code for minimization procedure may take the form:

```
int iter = 0
Pairs pairs;
Model model;
// this initialize model with the zero order approximation
model.initialize( );
do
    // use model with given parameters to reconstruct pairs
    formPairs (model, pairs);
    // use pairs to modify model parameters to minimize F
    matchPairs (model, pairs);
while (iter < maxIter);
```

Initial state of the model is deduced from the manual input.

Figure 10:
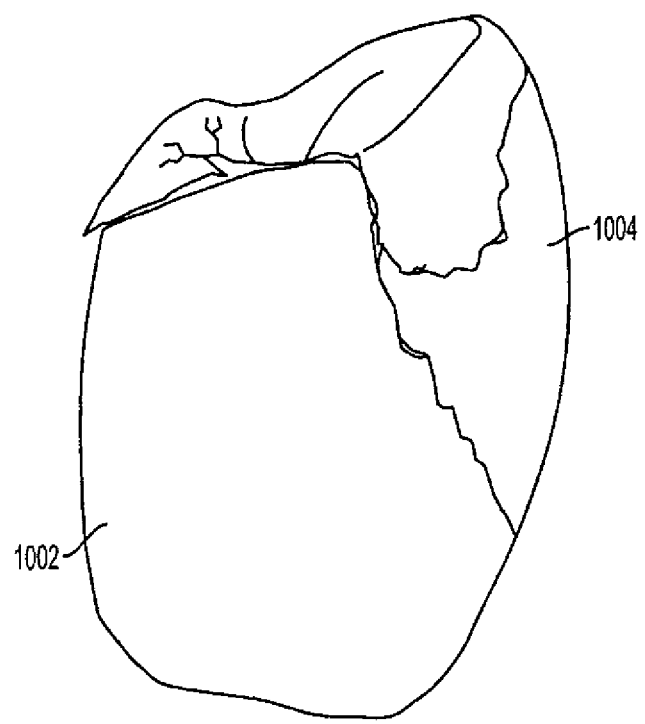
FIG. 10 is a representation of a resulting matched model and the original crown to which it is intended to match in accordance with an embodiment of the present invention.

Once the matching procedure is complete, the result is a matched model 1002 and original crown 1004 as represented in FIG. 10. These surfaces are similar, but not yet the same. Thus, matched model 1002 may be morphed to original crown 1004 to more closely approximate the surface of original crown 1004 and keep the shape anatomical at the same time.

For teeth having a typical anatomy, the shape modification during the morphing stage may be relatively small. However, exceptional cases may exist having unusual tooth anatomy not represented by the set of etalon teeth set (FIG. 2). Unusual anatomy may occur, for example, if a tooth was physically damaged and/or unusually worn.

Figure 11:
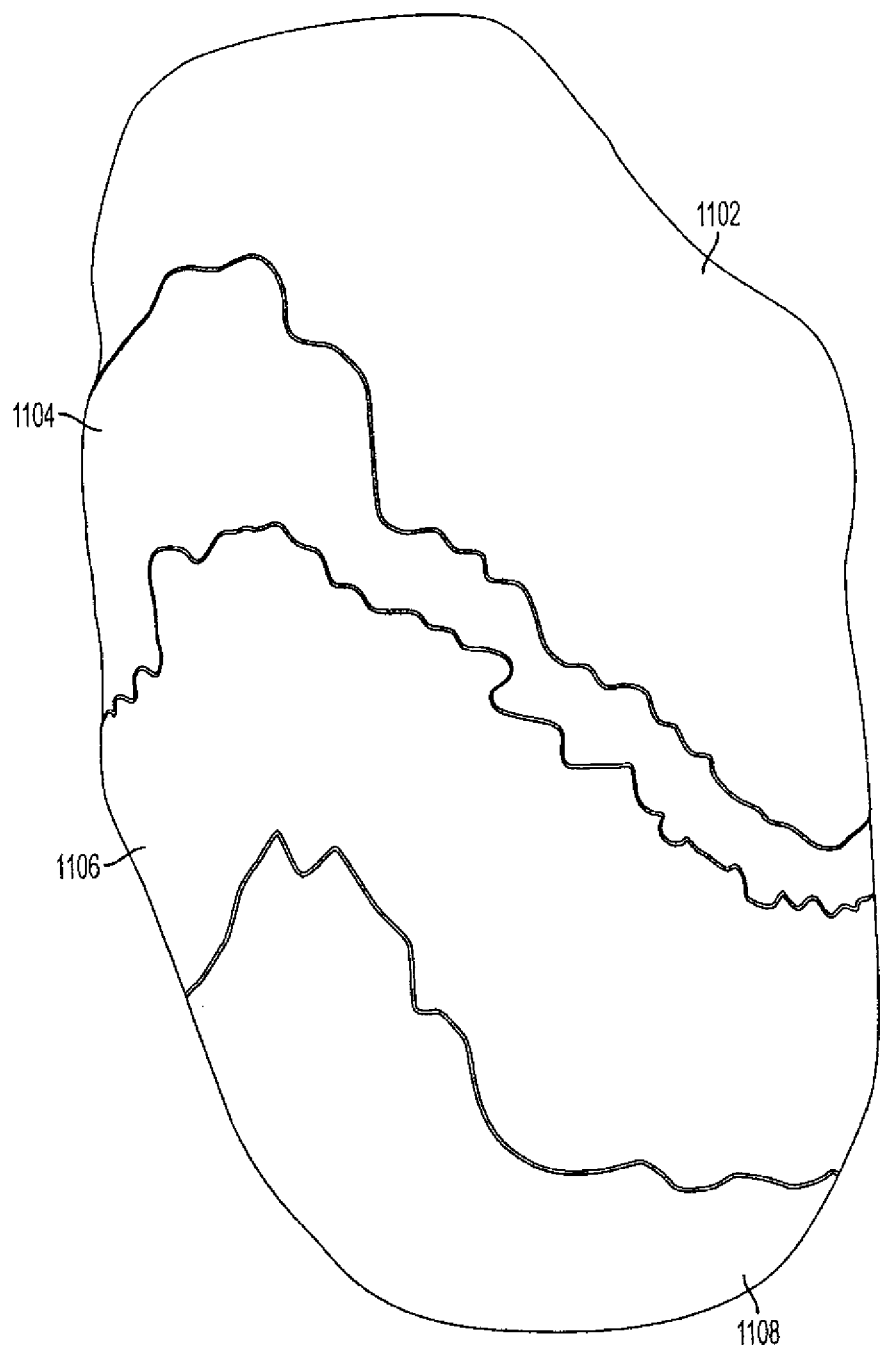
FIG. 11 is a simplified illustration of a clinical crown divided into four regions as used in accordance with an embodiment of the present invention.

Morphed shape 1006 satisfies the following criteria, in various combinations: it is smooth; it follows original crown 1004; it mimics matched model 1002 in the rest places; and it is more convex than concave. The proper combination of criteria depends on the point location. Thus, to achieve this, as shown in FIG. 11, the whole tooth surface is divided into 4 regions: 1) inner crown 1102; 2) crown boundary 1104; 3) reconstructed shape boundary 1106; and 4) reconstructed root 1108.

The segmentation is based on the projection of matched model 1002 to original crown 1004. Assuming that the vertex v of matched model 1002 belongs to original crown 1004 if $u = \text{proj}_C(v)$ does not belong to the boundary of C, and either:

$$\angle(n_v, u - v) \leq \alpha_0,$$

or a ray $R(v, \pm n_v)$ intersects original crown 1004 at some point w and $$\angle(n_v, n_w) \leq \alpha_0.$$

This allows for a distinguishment of vertices from regions 1 and 2 (crown vertices) and vertices from regions 3 and 4 (reconstructed and root vertices).

To distinguish regions 1 and 2 a predefined size of the boundary region is used. Thus, the vertex v belongs to the region 2 if the distance (in edges) from v to the boundary of original crown 1004 part of the model is less than a certain threshold distance. A similar rule is applicable to distinguishing regions 3 and 4.

Smoothing is governed by rules that describe transformation of a single vertex. The processing of a vertex depends on the region to which it belongs (FIG. 11). Thus, for example:

1. Reconstructed root 1108. Do nothing:

$$p_i^{n+1} = p_i^n.$$

2. Inner crown 1102:

$$p_i^{n+1} = \alpha <p_i^n> + (1-\alpha) c^{proj}(<p_i^n>).$$

where $<p_i^n>$ defines the averaged position of $p_i^n$ and neighbor vertices. $\alpha$—constant parameter required to assure stability of the iteration process.

3. Reconstructed shape boundary 1106:

$$p_i^{n+1} = \alpha <p_i^n> + (1-\alpha) h_i n_i^n,$$

where $n_i$—normal at the vertex, $h_i$ is the 'height' of the vertex computed on the model shape in the zero iteration:

$$h_i = (p_i^0 - <p_i^0>) n_i^0.$$

It's probably the simplest measure of curvature of the etalon shape. Addition of the height required to compensate shrinkage due to ordinary Laplacian smoothing, which is defined by the transformation $p^{n+1} = <p^n>$.

4. Crown boundary 1108

In this region the rules of processing are intermediate between inner crown 1102 and reconstructed shape boundary region 1106 with the coefficient linearly dependent on the distance. Thus, there is smooth transition in processing between the three regions.

Figure 12:
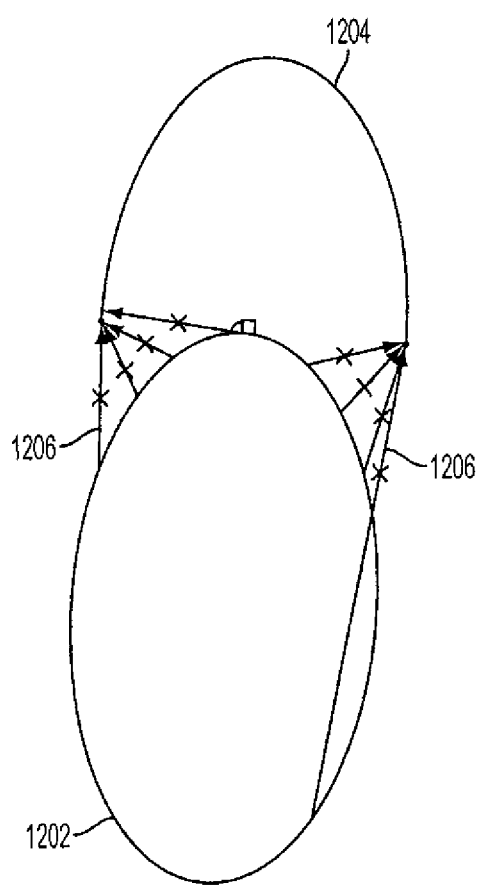
FIG. 12 is a simplified illustration of a complexity associated with morphing of a matched model with a clinical crown near an area of significant convexity in accordance with the present invention.

It has been found that divergence of matched model 1002 and original crown 1004 may be high, especially in areas with high crown curvature and bad initial matching, even if all the tooth vertices are located on the crown. As shown in FIG. 12, morphing of a tooth 1202 near an area of significant crown convexity 1204, using projection to the nearest point, shown by arrows 1206, leads to significant divergence between surfaces.

To alleviate the problems, movement along a line may not be farther than a distance to the projection point. This diminishes leaps of vertices as soon as they approach a crown. Also, direction of normals are not recomputed during the first half of iterations, while the surfaces are not near enough.

The present invention has been described above with reference to various exemplary embodiments. However, those skilled in the art will recognize that changes and modifications may be made to the exemplary embodiments without departing from the scope of the present invention. For example, the various operational steps, as well as the components for carrying out the operational steps, may be implemented in alternate ways depending upon the particular application or in consideration of any number of cost functions associated with the operation of the system, for example, various of the component and methodologies and/or steps may be deleted, modified, or combined with other components, methodologies and/or steps. These and other functions, methods, changes or modifications are intended to be included within the scope of the present invention, as set forth in the following claims.

What is claimed is:

1. A computer-implemented method, comprising:
generating a first set of digital data representing a clinical crown of a particular tooth and being a particular tooth type of a patient, wherein the first set of digital data includes known surfaces of the clinical crown, and wherein the first set of digital data comprises parameters including at least cusp size information of a number of cusps of the particular tooth;
generating a second set of digital data representing an average tooth model of the particular tooth type, wherein the second set of digital data includes a tooth model mesh;
fitting the second set of digital data to the first set of digital data to create a set of digital data representing an interim tooth model that includes the known surfaces of the clinical crown and reconstructed surfaces representing unknown surfaces of the clinical crown, wherein fitting the second set of digital data includes:
choosing points on a surface of the clinical crown;
selecting corresponding points on the tooth model mesh to form a plurality of point pairs between the clinical crown and the tooth model mesh; and
iteratively minimizing distances between the plurality of point pairs until the points are coupled, thereby creating points in the interim tooth model; and
smoothing a shape of the interim tooth model by smoothing a transition zone between the known surfaces of the clinical crown and the reconstructed surfaces by:
dividing a tooth surface of the interim tooth model into regions including an inner crown region, a crown boundary region, a reconstructed shape boundary region, and a reconstructed root;
transforming vertices in the interim tooth model differently based whether the vertices is on the inner crown region or the reconstructed shape boundary region, wherein transforming a vertex located in the inner crown region is in a direction toward a projection of the vertex to a surface of the clinical crown, and wherein transforming a vertex located in the reconstructed shape boundary region includes a height of the vertex computed on the shape of the interim tooth model in a zero iteration; and
providing instructions to create an orthodontic aligner using the interim tooth model that includes the known surfaces of the clinical crown and the reconstructed surfaces representing the unknown surfaces of the clinical crown.

2. The computer-implemented method of claim 1, wherein the tooth model comprises an interim tooth model, and wherein the method further includes:
processing the second set of digital data, representing a plurality of digital tooth models of a particular tooth type each having a first parameterization, to obtain a third set of digital data representing an average tooth model of the particular tooth type having a second parameterization which is less than the first parameterization;
fitting the third set of digital data to a first set of digital data, representing a clinical crown, to create a set of digital data representing the interim tooth model; and
morphing the set of digital data representing the interim tooth model to substantially mimic the anatomical shape of the clinical crown of the first set of digital data, including smoothing the shape of the interim tooth model.

3. The computer-implemented method of claim 2, wherein the method includes representing surfaces of the average tooth model with a mesh.

4. The computer-implemented method of claim 2, wherein the method includes generating the first set of digital data and the second set of digital data.

5. The computer-implemented method of claim 2, wherein fitting the third set of digital data to the first set of digital data comprises:
sampling points on a surface represented in the third set of digital data; and
forming point pairs by projecting the points to the first set of digital data.

6. The computer-implemented method of claim 1, wherein dividing the tooth surface includes distinguishing vertices in the inner crown region and the crown boundary region from vertices in the reconstructed shape boundary region and the reconstructed root.

7. The computer-implemented method of claim 6, wherein morphing the set of digital data representing the interim tooth model includes:
distinguishing the vertices in the inner crown region from the vertices in the crown boundary region; and
distinguishing the vertices in the reconstructed shape boundary region from the vertices in the reconstructed root.

8. A computer-implemented method, comprising:
generating a first set of digital data representing a clinical crown of a particular tooth and being a particular tooth type of a patient, wherein the first set of digital data includes known surfaces of the clinical crown, and wherein the first set of digital data comprises parameters including at least cusp size information of a number of cusps of the particular tooth;
generating a second set of digital data representing an average tooth model of the particular tooth type, wherein the second set of digital data includes a tooth model mesh;
fitting the second set of digital data to the first set of digital data to create a set of digital data representing an interim tooth model that includes the known surfaces of the clinical crown and the unknown surfaces of the clinical crown, wherein fitting the second set of digital data includes:
choosing points on a surface of the clinical crown;
selecting corresponding points on the tooth model mesh to form a plurality of point pairs between the clinical crown and the tooth model mesh; and
iteratively minimizing distances between the plurality of point pairs until the points are coupled, thereby creating points in the interim tooth model;
dividing a tooth surface of the interim tooth model into regions including an inner crown region, a crown boundary region, a reconstructed shape boundary region, and a reconstructed root; and smoothing a shape of the interim tooth model by smoothing a transition zone between the known surfaces of the clinical crown and the reconstructed surfaces by:
  transforming vertices in the interim tooth model differently based whether the vertices is on the inner crown region or the reconstructed shape boundary region, wherein transforming a vertex in the reconstructed shape boundary region in a direction toward a projection of the vertex to a surface of a crown by a fraction of a distance between the vertex and a target position by iterating points in the reconstructed shape boundary region toward the target position; and
  providing instructions to create an orthodontic aligner using the interim tooth model that includes the known surfaces of the clinical crown and the reconstructed surfaces representing the unknown surfaces of the clinical crown.

9. The computer-implemented method of claim 8, wherein the tooth model comprises an interim tooth model, and wherein the method further includes:
  processing the second set of digital data, representing a plurality of digital tooth models of a particular tooth type each having a first parameterization, to obtain a third set of digital data representing an average tooth model of the particular tooth type having a second parameterization which is less than the first parameterization;
  fitting the third set of digital data to a first set of digital data, representing a clinical crown, to create a set of digital data representing the interim tooth model; and
  morphing the set of digital data representing the interim tooth model to substantially mimic the anatomical shape of the clinical crown of the first set of digital data, including smoothing the shape of the interim tooth model.

10. The computer-implemented method of claim 9, wherein the method includes representing surfaces of the average tooth model with a mesh.

11. The computer-implemented method of claim 9, wherein the method includes generating the first set of digital data and the second set of digital data.

12. The computer-implemented method of claim 8, wherein dividing the tooth surface includes distinguishing vertices in the inner crown region and the crown boundary region from vertices in the reconstructed shape boundary region and the reconstructed root.

13. The computer-implemented method of claim 12, wherein morphing the set of digital data representing the interim tooth model includes:
  distinguishing the vertices in the inner crown region from the vertices in the crown boundary region; and
  distinguishing the vertices in the reconstructed shape boundary region from the vertices in the reconstructed root.

14. A computer-implemented method, comprising:
  generating a first set of digital data representing a clinical crown of a particular tooth and being a particular tooth type of a patient, wherein the first set of digital data includes known surfaces of the clinical crown, and wherein the first set of digital data comprises parameters including at least cusp size information of a number of cusps of the particular tooth;
  generating a second set of digital data representing an average tooth model of the particular tooth type, wherein the second set of digital data includes a tooth model mesh;
  fitting the second set of digital data to the first set of digital data to create a set of digital data representing an interim tooth model that includes the known surfaces of the clinical crown and reconstructed surfaces representing unknown surfaces of the clinical crown, wherein fitting the second set of digital data includes:
    choosing points on a surface of the clinical crown;
    selecting corresponding points on the tooth model mesh to form a plurality of point pairs between the clinical crown and the tooth model mesh; and
    iteratively minimizing distances between the plurality of point pairs until the points are coupled, thereby creating points in the interim tooth model; and
  morphing a set of digital data representing the interim tooth model to substantially mimic the anatomical shape of the clinical crown of the first set of digital data, including:
    dividing a tooth surface of the interim tooth model into regions including an inner crown region, a crown boundary region, a reconstructed shape boundary region, and a reconstructed root; and
    smoothing a shape of the interim tooth model by smoothing a transition zone between the known surfaces of the clinical crown and the reconstructed surfaces by:
      transforming vertices in the interim tooth model differently based whether the vertices is on the inner crown region, the crown boundary region, or the reconstructed shape boundary region, wherein transforming a vertex located in the crown boundary region is toward a projection of the vertex to a surface of a crown by a fraction of a distance between the vertex and a target position by iterating points in the crown boundary region toward the target position, and wherein transforming a vertex located in the reconstructed shape boundary region is based on a height of the vertex in a zero iteration; and
    providing instructions to create an orthodontic aligner using the interim tooth model that includes the known surfaces of the clinical crown and the unknown surfaces of the clinical crown.

15. The computer-implemented method of claim 14, wherein the tooth model comprises an interim tooth model, and wherein the method further includes:
  processing the second set of digital data, representing a plurality of digital tooth models of a particular tooth type each having a first parameterization, to obtain a third set of digital data representing an average tooth model of the particular tooth type having a second parameterization which is less than the first parameterization;
  fitting the third set of digital data to a first set of digital data, representing a clinical crown, to create a set of digital data representing the interim tooth model; and
  morphing the set of digital data representing the interim tooth model to substantially mimic the anatomical shape of the clinical crown of the first set of digital data, including smoothing the shape of the interim tooth model.

16. The computer-implemented method of claim 15, wherein the method includes representing surfaces of the average tooth model with a mesh.

17. The computer-implemented method of claim 15, wherein the method includes generating the first set of digital data and the second set of digital data.

18. The computer-implemented method of claim 14, wherein dividing the tooth surface includes distinguishing vertices in the inner crown region and the crown boundary region from vertices in the reconstructed shape boundary region and the reconstructed root.

19. The computer-implemented method of claim 18, wherein morphing the set of digital data representing the interim tooth model includes:
   distinguishing the vertices in the inner crown region from the vertices in the crown boundary region; and
   distinguishing the vertices in the reconstructed shape boundary region from the vertices in the reconstructed root.

\* \* \* \* \*